(12) United States Patent
Kishimoto et al.

(10) Patent No.: US 7,016,703 B2
(45) Date of Patent: Mar. 21, 2006

(54) PORTABLE INFORMATION APPARATUS FOR DISPLAYING INFORMATION IN A FOLDED STATE

(75) Inventors: Satoru Kishimoto, Tenri (JP); Kazuhiko Tsuda, Ikoma-gun (JP); Katsuya Mizukata, Shijonawate (JP); Kenichi Katoh, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 614 days.

(21) Appl. No.: 10/000,239

(22) Filed: Nov. 2, 2001

(65) Prior Publication Data

US 2002/0094846 A1 Jul. 18, 2002

(30) Foreign Application Priority Data

Nov. 2, 2000 (JP) ............................. 2000-336758
Sep. 5, 2001 (JP) ............................. 2001-269571

(51) Int. Cl.
  *H04B 1/38* (2006.01)
  *H04M 1/00* (2006.01)
(52) U.S. Cl. ................ 455/566; 455/550.1; 455/575.1; 455/575.3; 455/575.8; 455/90.3; 379/433.13
(58) Field of Classification Search ............. 455/550.1, 455/575.1, 575.3, 575.8, 90.3, 566; 379/433.13
See application file for complete search history.

(56) References Cited

U.S. PATENT DOCUMENTS

| 6,067,459 | A  | * | 5/2000 | Lincoln et al. ............. 455/566 |
| 6,088,240 | A  | * | 7/2000 | Steinhoff et al. ........... 361/814 |
| 6,230,028 | B1 | * | 5/2001 | Shirakawa .................. 455/566 |
| 6,618,043 | B1 | * | 9/2003 | Washio et al. .............. 345/204 |
| 6,662,244 | B1 | * | 12/2003 | Takahashi ..................... 710/14 |
| 2001/0049293 | A1 | * | 12/2001 | Shimazaki .................. 455/550 |
| 2002/0033836 | A1 | * | 3/2002 | Smith .......................... 345/649 |

FOREIGN PATENT DOCUMENTS

JP    409186752    * 12/1995
JP    2000-184023    6/2000

* cited by examiner

*Primary Examiner*—Nay Maung
*Assistant Examiner*—Sujatha Sharma
(74) *Attorney, Agent, or Firm*—David G. Conlin; Steven M. Jensen; Edwards Angell Palmer & Dodge LLP

(57) ABSTRACT

Disclosed is a portable information apparatus, which is provided with a display section capable of displaying a color display and a dynamic display in a high image quality, and which consumes less electricity. When the portable information apparatus of a folder type is in a folded state, a display screen 100 is composed of an image display region and a non-image region, so that at least a part of the image display region can be seen via a transparent section 102.

10 Claims, 21 Drawing Sheets

FIG. 8 (a)
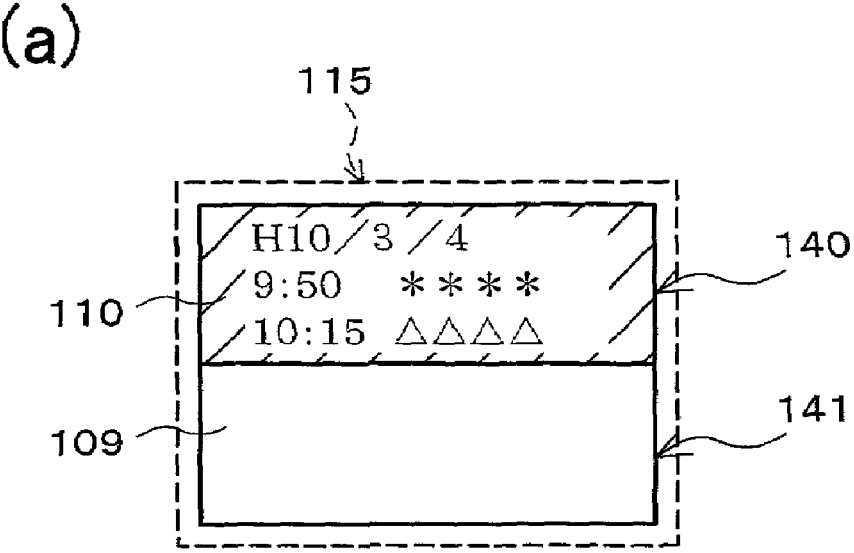
FIG. 8 (b)
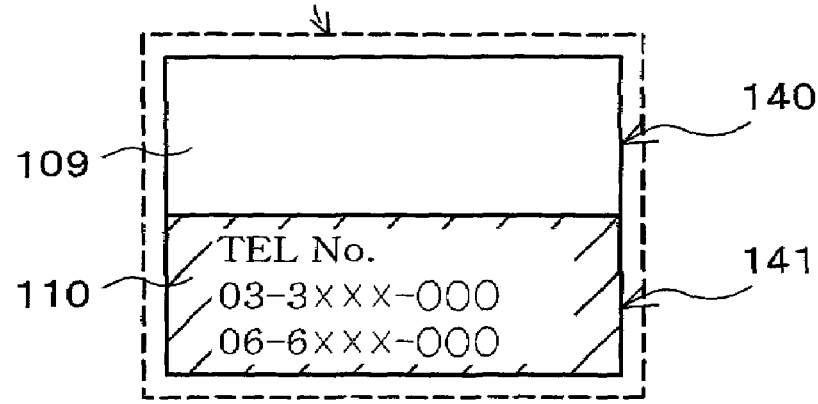

FIG. 21 (a)     FIG. 21 (b)     FIG. 21 (c)
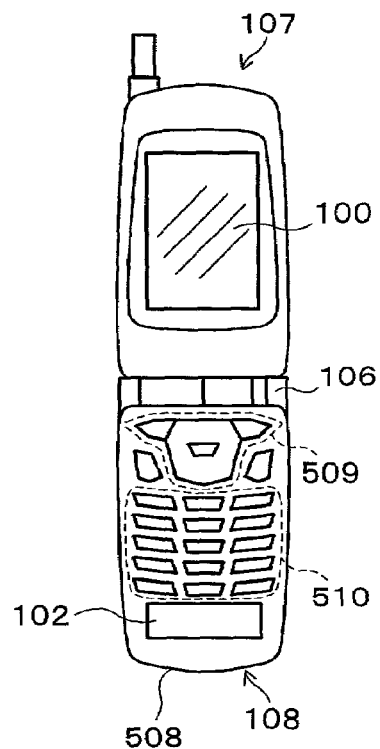 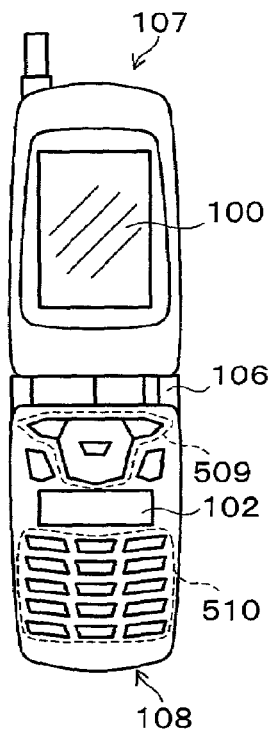 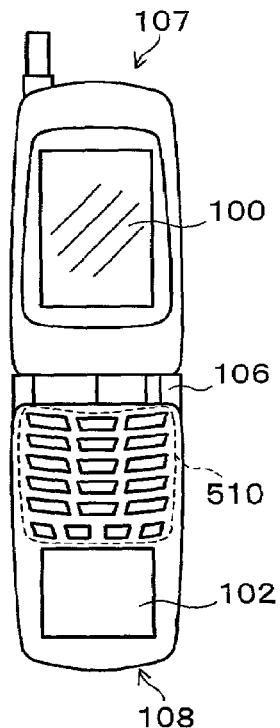

PORTABLE INFORMATION APPARATUS FOR DISPLAYING INFORMATION IN A FOLDED STATE

FIELD OF THE INVENTION

The present invention relates to a portable information apparatus of a folder type, in which at least a part of information displayed on an image display region of a display section can be seen, when the portable information apparatus remains being folded.

BACKGROUND OF THE INVENTION

At present, widely used as a portable information apparatus is a portable telephone. As electronic parts have been developed to be smaller in size, lighter in weight and more sensitive, various portable telephones having a portable telephone main body that is smaller in outer shape, and light in weight.

A portable telephones, in general, is provided with a main body, an antenna, which is installed on an upper part of the main body, a display screen, which displays various information such as a receiving condition of the antenna (radio wave receiving condition), information how long a battery lasts (battery lasting information) and the like, operation buttons including a plurality of number keys and function keys, a speaker and a microphone.

Recently, a portable telephone of a folder type has become more popular. The portable telephone of the folder type is generally provided with an upper main body, a lower main body, and a hinge. The upper main body is provided with the display screen for displaying the information, the speaker, and the antenna, while the lower main body is provided with the operation buttons and the microphone. The hinge connects the upper and the lower main bodies so that the upper and the lower main bodies can be folded and unfolded in such a manner that the upper and the lower main bodies make a predetermined angle that is suitable for having a talk by using the portable telephone of the folder type when the portable telephone of the folder type is unfolded.

When the portable telephone of the folder type is in a call wait state where the portable telephone of the folder type remains being folded (in a folded state), that is, the upper main body is folded with respect to the lower main body, the operations bottoms of the lower main body are covered with the upper main body. It is advantage that this prevents error operation of the operation bottoms. Moreover, when the portable telephone of the folder type is in a talking state where the portable telephone is unfolded, that is, the upper main body is unfolded with respect to the lower main body, the lower main body can be used as a voice collecting board for collecting voice. This gives such merit that the voice collecting ability of the microphone is improved.

Recently, it has become possible for the portable information apparatus such as the portable telephone to transmit a large data at a high speed. This encourages development of a display screen of the portable information apparatus having a high image quality, in response to a recent trend that the portable telephone has a color display and a dynamic image display, for example.

Used as the display screen for the portable information apparatus is a liquid crystal display apparatus that has excellent characteristics such as a thin shape, a light weight, and low electricity consumption, in general. There are a passive matrix method and an active matrix method for a display mode and a driving method of the liquid crystal display apparatus. However, a liquid crystal display apparatus of the passive matrix method, such a Super Twisted Nematic method (hereinafter, just referred to as STN) has come in practical use, because the liquid crystal display apparatus of the passive matrix method consumes less electricity and costs less.

Moreover, it has also been intensively studied for developing a liquid crystal display apparatus of the active matrix method as the display screen for the portable telephone. The liquid crystal display apparatus of the active matrix method is provided with a switching element in each pixel in order to improve display properties. Examples of the switching element (active element) are a non-linear element having two terminals, and a non-linear terminal having three terminals, while a typical switching element that has been developed so far is a Thin Film Transistor (hereinafter, denoted as TFT) that is a type of the non-linear element having three terminal.

A liquid crystal display apparatus of the active matrix method, in which the TFT is provided, has such excellent display properties that the display has an excellent brightness, a high contrast and a high response speed, for example. Because the display properties enable the liquid crystal display apparatus of the active matrix method to perform the color display and the dynamic image display in the high image quality, the liquid crystal display apparatus of the active matrix method having the TFT is regarded as the most suitable device as the display screen for the portable telephone.

In a conventional portable telephone of the folder type, it is necessary to unfold the upper main body with respect to the lower main body so as to check the various information displayed on the display screen during the call wait state. Therefore, it is so inconvenient for a user that he has to fold and unfold the upper main body with respect to the lower main body each time he checks the various information. Among the various information, the receiving condition of the antenna and the information how long the battery lasts (battery lasting information) are checked so often. Thus, it is so troublesome to fold and unfold the upper main body with respect to the lower main body every time for checking those kinds of the information.

Therefore, the Japanese Un-examined Patent Publication Tokukai No. 2000-184023 (published on Jun. 30, 2000) discloses a portable telephone that has a structure that shows, through a transparent window of a holder, the information on the display screen. However, the portable telephone recited in the publication (the portable telephone of the prior art) need display the whole region of the screen all the time even when the portable telephone is in the call wait state. Thus, the portable telephone of the prior art will have a difficulty to achieve low electricity consumption when the portable telephone of the prior art is required to have the high image quality in response to the trend that the display screen displays the color display and the dynamic image display. Moreover, it is difficult for the portable telephone of the prior art to display many pieces of the information at once because a touch screen for data input, which is provided on a display section, reduces a region where the information is displayed when the data is inputted.

At present when there is a demand for the display screen having the high image quality for the color display and the dynamic image display. Thus, the liquid crystal display apparatus of the STN method (STN liquid crystal display apparatus) has such advantages that the STN liquid crystal display apparatus consumes such a little electricity (10 to 15 mW) when the screen is as small as 2-inch size, while the STN liquid crystal display apparatus has problems of a poor brightness, a low contrast, and slow response speed, which make it difficult for the STN liquid crystal display apparatus to attain satisfactory image quality. Therefore, in order to attain the satisfactory image quality, it is necessary to use the liquid crystal display apparatus of the active matrix method that uses a three-terminal element having an excellent display ability, such as the TFT.

However, the liquid crystal display apparatus of the active matrix method has such a complicated peripheral driving circuit, compared with the STN liquid crystal display apparatus. For this reason, the liquid crystal display apparatus of the active matrix method consumes a large electricity (100 to 150 mW), even if the screen is as small as the 2-inch size, thus it is not so suitable for use in the portable telephone. Therefore, if the liquid crystal display apparatus of the active matrix method is used in an apparatus, which need display the whole region of a display screen all the time, such as the portable telephone recited in the publication, it is hard to achieve low electricity consumption in the apparatus.

SUMMARY OF THE INVENTION

The present invention, which has been contrived for solving the forgoing problems, has an object to provide a portable information apparatus in which various information displayed on a display screen can be checked in a call wait state without folding and unfolding an upper main body with respect to a lower main body, and a high image quality and low electricity consumption are compatibly achieved for a display screen that performs a color display and a dynamic image display.

In order to attain the forgoing objects, a portable information apparatus, which is of a folder type, is provided with a display section for displaying information on one of surfaces that face each other when the portable information apparatus is folded, wherein the display section is composed of an image display region and a non-image region, where at least a part of the image display region can be seen when the portable information apparatus is folded.

With the above arrangement, it is possible to compatibly attain the high image quality and the low electricity consumption for the display section of the portable information apparatus because the display section can suppress its electricity consumption.

In other words, while the portable information apparatus remains being folded, the display section is composed of the image display region and a non-image region, of which electricity consumption is lower than that of the image display region. In short, the portable telephone of the present invention has lower electricity consumption, compared with the portable telephone having a display section that displays information on the whole region all the time, because the display section of the portable telephone of the present invention has the non-image region in which the electricity consumption is low.

For this reason, it is possible to keep the electricity consumption low, for example, even if a liquid crystal display apparatus of an active matrix method having a TFT or the like, which can perform the color display and the dynamic image display in a high image quality, is used for the display section of the portable information apparatus. Because this achieves the high image quality and low electricity consumption compatibly as to the display section, it is possible to provide the portable information apparatus, which has the display section with the high image quality and the low electricity consumption.

Moreover, for example, in case the portable information apparatus is a portable telephone, it is possible to display information, which is often checked during the call wait state, on a part of the image display region, which can be seen. The information, which is often checked during the call wait state, is, for example, a receiving condition of an antenna, information how long a battery lasts, and the like information. This allows the information to be seen while the portable information apparatus remains being folded, thus making it possible to check the information without folding and unfolding the portable telephone.

The portable information apparatus of the folder type is provided with (1) a first section, which includes the display section (display screen) for displaying the information, and (2) a second section, which is linked with the first section in such a manner that the second section can be folded and unfolded with respect to the display section for displaying the information, where the display section faces to the second section when the portable information apparatus remains being folded (that is, in a folded state).

In order to show the part of the image display region while the portable information apparatus remains being folded, the portable information apparatus may have, for example, an arrangement where a section made of a transparent material, in other words, a transparent section, is provided in a part of a section, which faces the display section when the portable information apparatus is in the folded state, or an arrangement where a main body of the portable information apparatus is provided with an exposing section (for example, an open section, or notched section) so as to expose the part of the display section.

For a fuller understanding of the nature and advantages of the invention, reference should be made to the ensuing detailed description taken in conjunction with the accompanying drawings.

BRIEF DESCRIPTION OF THE DRAWINGS

FIG. 8(a) is a plan view that explains a case where a schedule is displayed on the display screen that is composed of regions that have been divided into a plurality of regions in advance.

FIG. 8(b) is a plan view that explains a case where a telephone number is displayed on the display screen that is composed of the regions that have been divided into a plurality of regions in advance.

FIG. 21(a) a plan view of the portable telephone of the folder type of the first embodiment of the present invention, which is provided with the transparent section near an end of the lower main body, which is opposite to a position of a hinge.

FIG. 21(b) is a plan view of the portable telephone of the folder type of the first embodiment of the present invention, which is provided with the transparent section in a vicinity of a center of the lower main body.

FIG. 21(c) is a plan view of the portable telephone of the folder type, which is provided with no cross key in the lower main body that is provided with the transparent section.

DESCRIPTION OF THE EMBODIMENTS

[First Embodiment]

Described below is an embodiment of the present invention, with reference to FIGS. 1 to 4, and 21(a) through 21(c). It should be noted that a case, where a portable information apparatus of the present invention is employed as a portable telephone of a folder type (hereinafter, just refer to as a portable telephone) is explained in the present embodiment.

Figure 1:
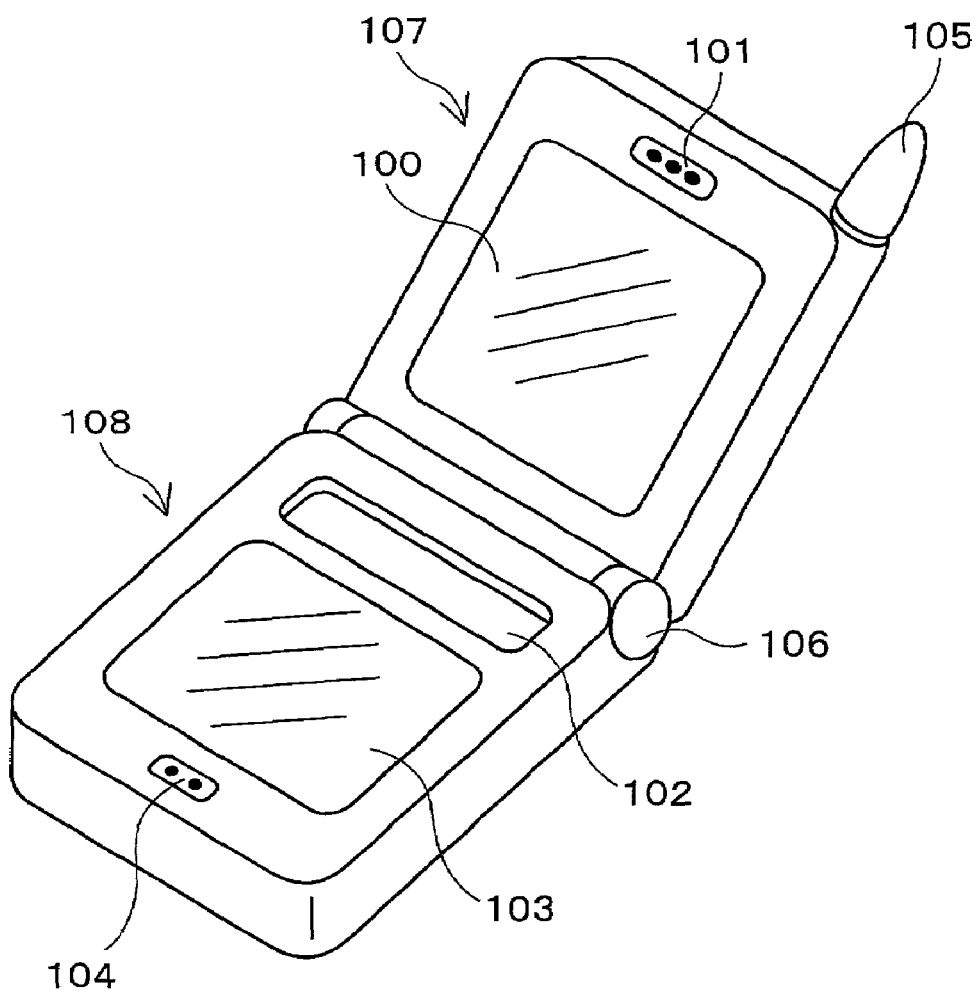
FIG. 1 is a perspective view illustrating a portable telephone of a folder type of a first embodiment of the present invention, which is unfolded.
Figure 2:
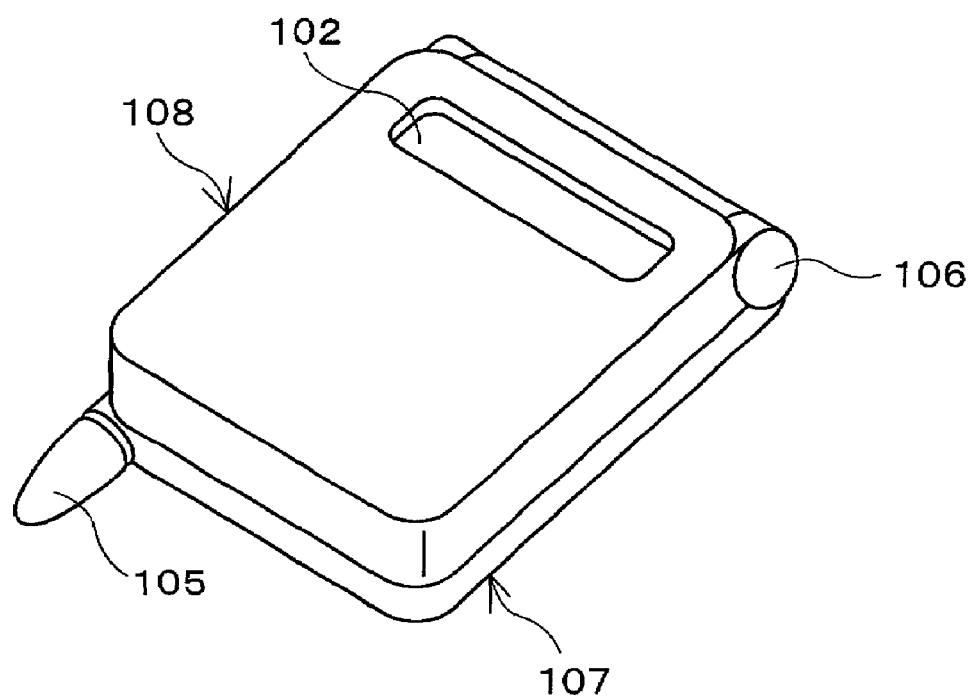
FIG. 2 is a perspective view showing the portable telephone of the folder type of the first embodiment of the present invention, which is folded.

FIGS. 1 and 2 are perspective views illustrating a portable telephone of the present embodiment, where FIG. 1 shows a state where the portable telephone is unfolded, that is, an upper main body 107 is unfolded with respect to a lower main body 108, while FIG. 2 illustrates a state where the portable telephone is folded, in other words, the upper main body 107 is folded with respect to the lower main body 108. Note that, in FIG. 2, illustrated is a state where the lower main body 108 overlaps the upper main body 107.

Figure 3:
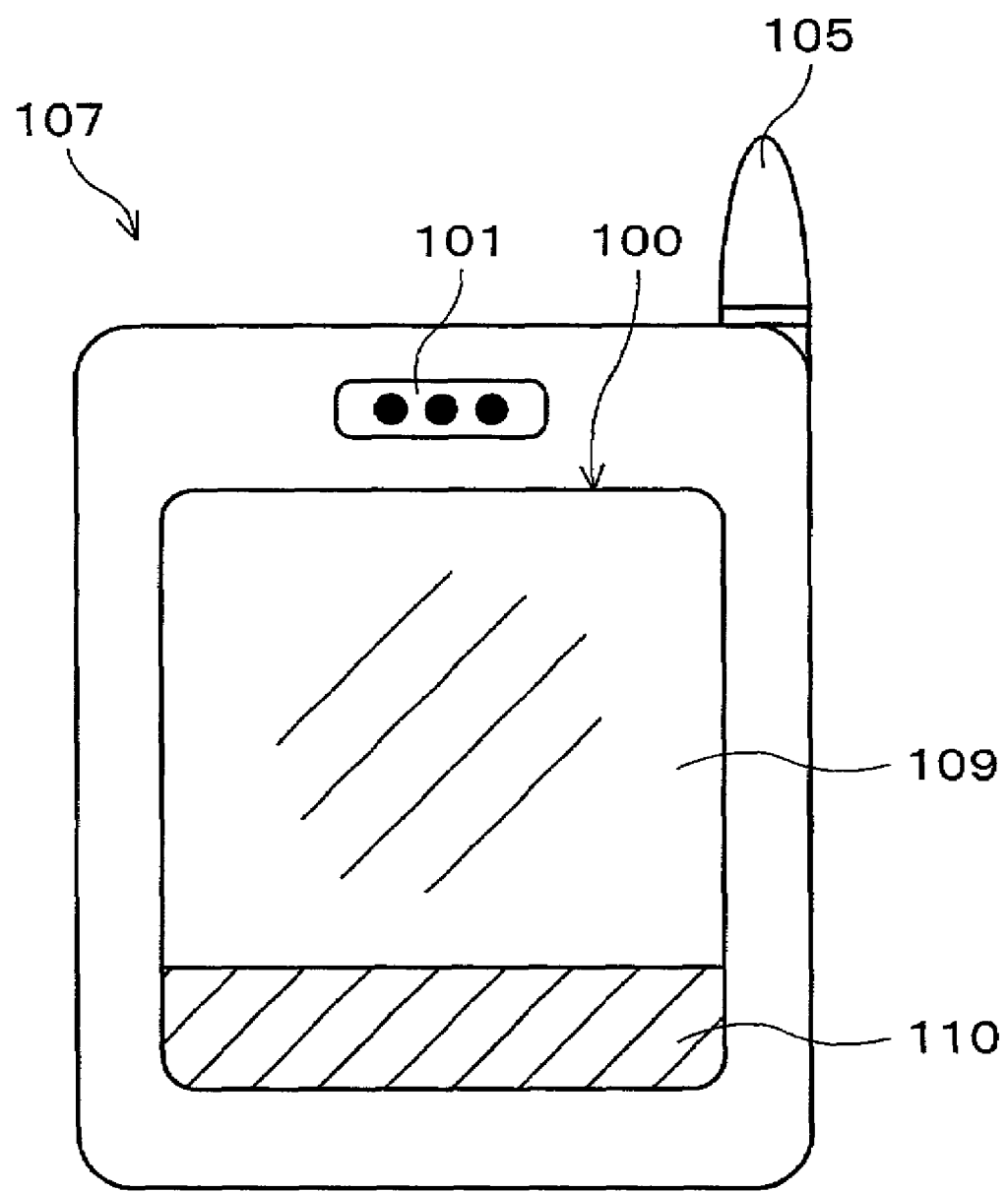
FIG. 3 is a plan view illustrating a display section of an upper main body of the portable telephone of the folder type of the first embodiment of the present invention.

In FIGS. 1 to 3, indicated by a reference numeral 100 is a display screen (display section), a reference numeral 101 indicates a speaker, a reference numeral 102 is a transparent section, a reference numeral 103 indicates an operation button, a reference numeral 104 is a microphone, and a reference numeral 105 indicates an antenna.

The upper main body 107 is provided with the display screen 100, the speaker 101, and the antenna 105, while the lower main body 108 is provided with the transparent section 102, the operation button 103 and the microphone 104. A hinge 106 is provided so as to connect the upper main body 107 and the lower main body 108 in such a manner that the upper main body 107 and the lower main body 108 can be folded and unfolded.

FIG. 3 is a plan view illustrating the upper main body 107. The display screen 100 of the upper main body 107 is composed of a non-image region (display section) 109 and an image display region (display section) 110. Used as the display screen 100 is a liquid crystal display apparatus of an active matrix method in which a TFT is formed. The TFT is a three-terminal element, which has an excellent brightness, a high contrast and a fast response speed. Because of this, the display screen 100 can performs a color display and a dynamic image display in a high image quality.

The non-image region 109 of the display screen 100, which is shown in FIG. 3, is a region where no display of information is carried out when the portable telephone remains being folded, The no display of information is performed by stopping a driving circuit that drives the display screen 100, or by a single-colored display, which is carried out by scanning all of scanning lines and applying a gradation voltage in a signal line. The image display region 110, which is indicated by slant lines, is a region where the display of information is continued by partial driving even when the portable telephone remains being folded. Moreover, when the portable telephone remains being unfolded, the display of information is carried out in both the non-image region 109 and the image display region 110, so that the display screen 100 performs a whole-screen display.

This makes it possible to check the information displayed on the image display region 110 while the portable telephone remains being folded. In this case, the information is displayed only on the image display region 110, while no information is displayed on the non-image region 109. As a result, the portable telephone can achieve low electricity consumption.

Referring to FIGS. 21(a) to 21(c), explained is a position in which the transparent section 102 is located in the portable telephone.

FIG. 21(a) is a plan view of a portable telephone that is provided with a transparent section 102 that locates near an edge section 508 of the lower main body 108, which is on the other side of the lower main body 108 with respect to the hinge 106. As shown in FIG. 21(a), it is possible to provide the transparent 102 near the edge section 508 that is more distant from the hinge 106, compared with a cross key 509 and ten keys 510 as the operation button 103 (See FIG. 1) of the lower main body 108. With this arrangement, where the transparent section 102 is provided in the location distant from the hinge 106 as much as possible, it is possible to have a space for installing a connector and an electric cell (not shown) for a flexible substrate that connects the upper main body 107 and the lower main body 108. In addition, the edge section 508 has a space for mounting a connecter for data communication.

FIG. 21(b) is a plan view of a portable telephone which is provided with a transparent section 102 in a vicinity of a center part of the lower main body 108. As shown in FIG. 21(b), it is possible to provide the transparent section 102 between the cross key 509 and the ten keys 510, in other words, in a vicinity of the center part of the lower main body 108. For example, in case an electric battery of a small size is used, it is unnecessary to have a large space for the electric battery near the location of the hinge 106 of the lower main body 108, on contrary to the arrangement shown in FIG. 21(a). This makes it possible to provide the transparent section 102 in the center part of the lower main body 108 as shown in FIG. 21(b).

FIG. 21(c) is a plan view of a portable telephone in which a transparent section 102 is provided in a portable telephone that has no cross key 509 in the lower main body 108. As shown in FIG. 21(c), in case where the cross key 509 is not provided as the operation button 103, it is possible to provide the transparent section 102 which is larger than the transparent sections 102 that is shown in FIGS. 21(a) and 21(b).

Note that, a transparent touch panel may be provided in the transparent 102. This makes it possible to operate the portable telephone by pushing a predetermined region on the touch panel in accordance with a display on the display screen 100 of the upper main body 107. In this way, the operation is carried out by pushing the region which corresponds to the display on the display screen 100, so that the operation can be performed in accordance with the information displayed on the image display region 110 of the display screen 100 (see FIG. 3), while the portable telephone remains being folded.

Figure 4:
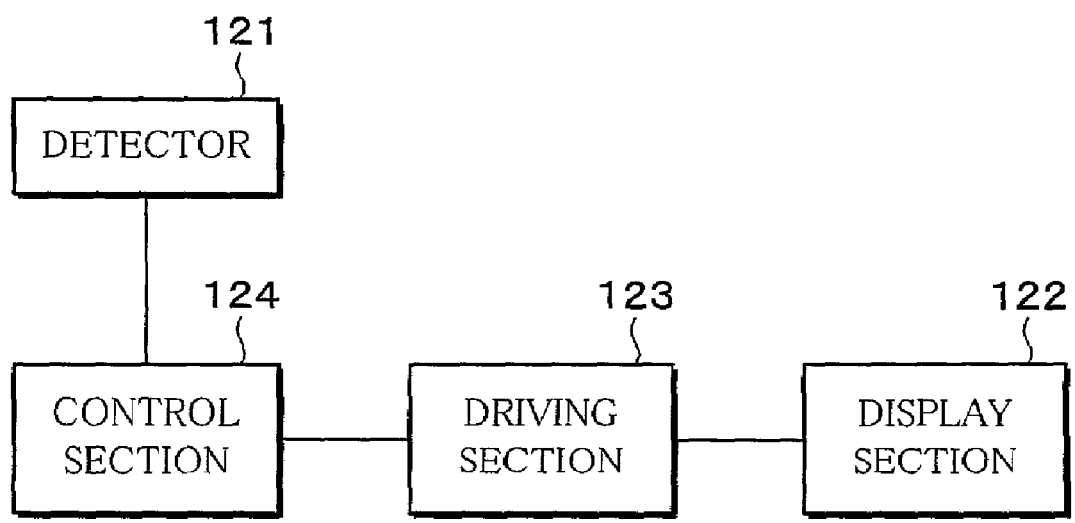
FIG. 4 is a block diagram of a schematic arrangement of the portable telephone of the folder type of the first embodiment of the present invention.
Figure 5:
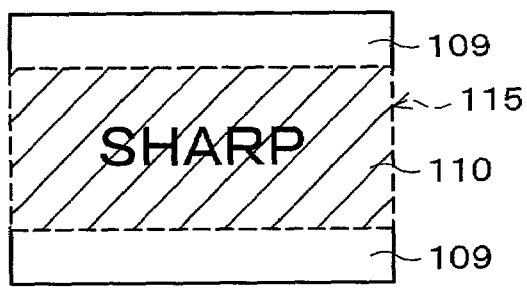
FIG. 5(a) is a plan view that explains a case where a recognizable region, which can be recognized via a transparent section of the portable telephone of the folder type of the first embodiment of the present invention, is identical with an image display region.
FIG. 5(b) is a plan view that explains a case where the recognizable region, which can be recognized via the transparent section of the portable telephone of the folder type of the first embodiment of the present invention, includes a whole of the image display region and a part of a non-image region.
FIG. 5(c) is a plan view that explains a case where the recognizable region, which can be recognized via the transparent section of the portable telephone of the folder type of the first embodiment of the present invention, includes a part of the image display region and a part of a non-image region.
FIG. 5(d) is a plan view that explains a case where the recognizable region, which can be recognized via the transparent section of the portable telephone of the folder type of the first embodiment of the present invention, includes a part of the image display region.
FIG. 5(e) is a plan view that explains a case where the recognizable region, which can be recognized via the transparent section of the portable telephone of the folder type of the first embodiment of the present invention, includes a whole of the image display region, a part of a non-image region, and a region out of a display screen.
FIG. 5(f) is a plan view that explains a case where the recognizable region, which can be recognized via the transparent section of the portable telephone of the folder type of the first embodiment of the present invention, includes a part of the image display region, and a region out of a display screen.
Figure 5:
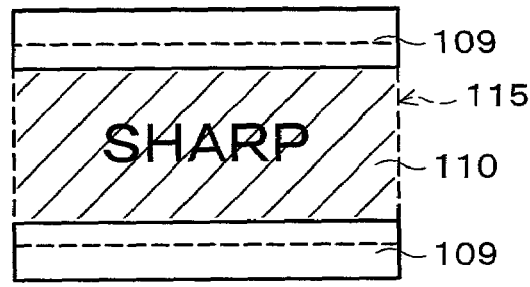
Figure 5:
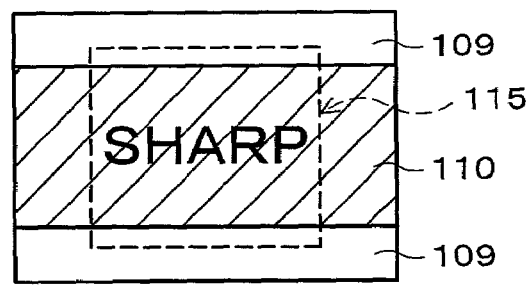
Figure 5:
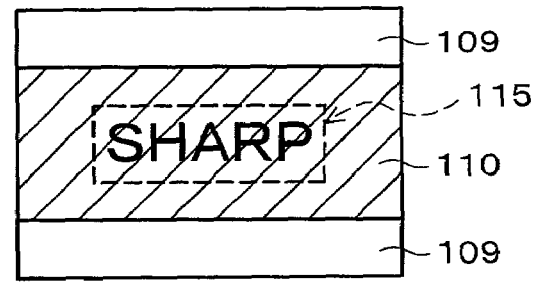
Figure 5:
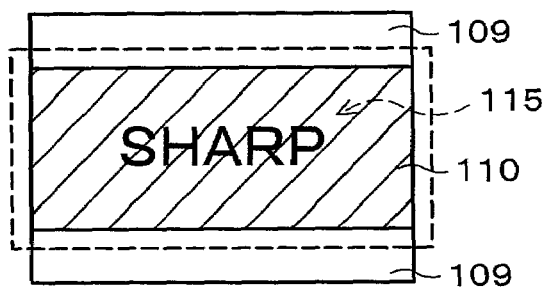
Figure 5:
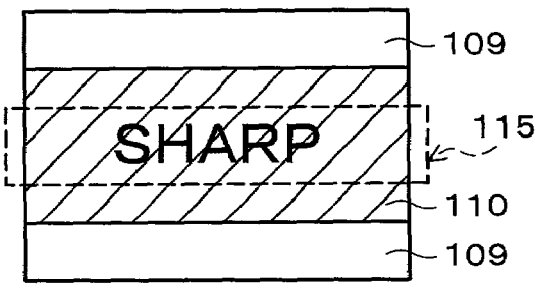

FIG. 4 is a block diagram showing a schematic arrangement of the portable telephone of the present embodiment. The portable telephone is, as shown in FIG. 4, provided with a detector (detecting means) 121 for detecting whether the portable telephone remains being folded or unfolded, and a driving section (driving circuit) 123 for driving a display section 122. The portable telephone is further provided with a control section (setting section, driving section control means for a CPU and the like) 124 for controlling the driving section 123 in such a manner that the information is displayed only on the image display region 110 (see FIG. 3) when the detector 121 detects that the portable telephone remains being folded.

The portable telephone carries out the display of the information only on the image display region 110 that can be seen when the portable telephone remains being folded (the portable telephone is in a folded state). If the portable telephone remains being unfolded (the portable telephone is in an unfolded state), the portable telephone can perform the whole-screen display of the display screen 100. In other words, the portable telephone can automatically switch over which of the regions in the display screen 100 displays the information, in accordance with a usage state (folding state (whether the portable telephone is folded or unfolded)).

This prevents the electricity from being wasted due to the whole-screen display of the display screen 100 (see FIG. 3) while the portable telephone remains being folded. Therefore, it is possible to ensure the achievement of the low electricity consumption for the portable telephone.

Note that, the detector 121 is not limited to a specific detector, provided that the detector can detect the usage state of the portable telephone. However, specific examples of the detector 121 are sensors for pressure, light, or the like, and a switch of a button type. The sensors for pressure, light or the like, detect a change in the pressure, the light or the like, when the change is caused in accordance with the usage state of the portable telephone, so as to detect the usage state of the portable telephone. Meanwhile, the switch of the button type detects the usage state of the portable telephone by using a button which is operated when the portable telephone is folded, so that the operation of the button changes resistance.

In general, the liquid crystal display apparatus is driven by scanning all scanning signal lines in order (in a stepwise manner) in a display screen. Meanwhile, a predetermined voltage is applied in data signal lines that cross the scanning signal lines at a right angle, so as to apply the voltage into pixels placed on the lines. In this way, the display is carried out on the liquid crystal display apparatus.

Here, in order to display only a part of the display screen, only scanning signal lines in a region to be displayed while scanning is not carried out for scanning lines in the rest of the display screen, instead of scanning all the scanning lines. At the same time, as to the data signal lines, which cross the scanning line at a right angle, the voltage is applied only into data signal lines in the part of the display screen to be displayed, but not in data signal lines in the rest of the display screen. In this way, the partial driving (driving only the part of the display screen) is performed easily.

Alternatively, it is possible to produce a non-display state in a such a simple method by applying an arbitrary gradation voltage in the data signal lines while scanning at once all the scanning line in the region not to be display in the display screen. Note that a driving circuit and a driving method of the display section that can produce the non-display state in a such a simple method will be explained later.

The image display region 110, which is indicated by the slant lines in FIG. 3, is so arranged as to overlap the transparent section 102 shown in FIG. 1, when the portable telephone is in the folded state. With the arrangement where the transparent section 102 and the image display region 110 overlap each other when the portable telephone is in the folded state, it is possible to check various information displayed on the image display region 110 of the display screen 100 through the transparent section 102. This allows a user to check the various information without unfolding the portable telephone.

The transparent section 102 may have any arrangement, provided that the image display region 110, which is the part of the display screen 100, can be seen through the transparent section 102 when the portable telephone is in the folded state. For example, the transparent section 102 may be a hole that penetrates through the lower main body 108, or may be the hole in which an acrylic board is inlaid.

In the present embodiment, the transparent section 102 is the hole, which penetrates through the lower main body 108, and in which the acrylic board is inlaid. Because used is the transparent section 102 in which the acrylic board is inlaid, the display screen 100 and the acrylic board are positioned to face each other when the portable telephone is in the folded state. This arrangement protects the display screen 100.

Moreover, the transparent section 102 may have such arrangement that a lens is inlaid in the transparent section 102 instead of the acrylic board, so as to magnify the information displayed on the image display region 110 of the display screen 100. Because the lens magnifies the information displayed on the image display region 110, this makes it easier to exactly recognize the information.

In the present embodiment, as shown in FIG. 3, the image display region 110 for the partial driving, which is carried out when the portable telephone is in the folded state, is located in the region which is indicated by the slant lines and is distant from the speaker 101. However, the position of the image display region 110 is not limited to this arrangement. The image display are 110 may be located in any position on the display screen 100, provided that when the portable telephone is in the folded state, at least a part of the image display region 110 is overlapped with a part or a whole of the transparent section 102 by locating the image display region in that position.

The image display region 110 may be positioned in any location on the display screen 100, for example: a region near the speaker 101, a central region, a region near the antenna 105, and a region distant from the antenna 105. Moreover, the image display region 110 may have any size, arbitrarily. In short, the image display region 110 may be arranged to have a suitable position and size in accordance with an appearance and design of the portable telephone.

As shown in FIGS. 5(a) to 5(f), a recognizable region 115 may have any position and size, provided that the recognizable region 115 is provided on the display screen 100 in such a manner that the information displayed on the image display region 110 can be seen. Therefore, the position and size of the recognizable region 115 may be decided in accordance with the design of the portable telephone. Note that, the recognizable region 115 is a region which can be recognized through the transparent section 102 (see FIGS. 1 and 2).

As shown in FIGS. 5(a) to 5(f), the recognizable region 115 may be located in any position such as: a position in which the whole image display region 110 can be seen; a position in which the whole image display region 110 and a part of the non-image region 109 can be seen; a part of the image display region 110 and a part of the non-image region 109 can be seen; a position where only a part of the image display region 110 can be seen; the whole image display region 110, a part of the non-image region 109, and region out of the display screen 100 can be seen; or, a position where a part of the image display region 110 and region out of the display screen 100 can be seen.

The information displayed on the display screen 100 has various contents in accordance with situations (for example, the contents may be time, a message, date, or a memorandum (memo)). Thus, a size of the region necessary to display the information may be varied in accordance with the contents of the information. Therefore, it is so arranged that the position and size of the image display region 110 are varied in accordance with the contents of the information. This arrangement prevents the image display region 110 from including a region not necessary for displaying the information. In other words, the ratio of the image display region 110 to the non-image region 109 or the position of the image display region 110 with respect to the non-image region 109 may be varied so that only a region for displaying really required information becomes the image display region 110, while an other part of the display screen 100 becomes the non-image region 109.

With this arrangement, where only the region for displaying really required information becomes the image display region 110, while the other part of the display screen 100 becomes the non-image region 109 that consumes a little electricity, it is possible to further reduce the electricity consumption of the portable telephone.

Figure 6:
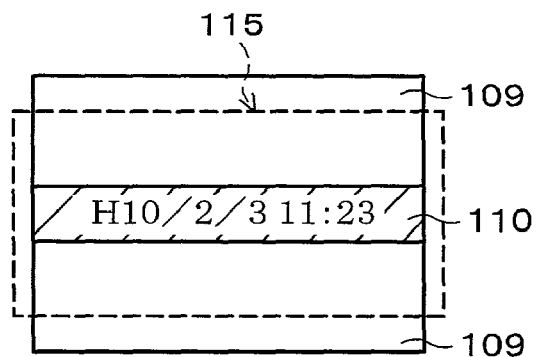
FIG. 6(a) is a plan view explaining how the image display region is changed in terms of a position and a size, in accordance with contents of information displayed on the display screen of the portable telephone of the folder type of the first embodiment of the present invention. Illustrated in FIG. 6(a) is a case where date and time are displayed on the display screen.
FIG. 6(b) is a plan view explaining how the image display region is changed in terms of a position and a size, in accordance with contents of information displayed on the display screen of the portable telephone of the folder type of the first embodiment of the present invention. Illustrated in FIG. 6(b) is a case where a notice for an arrival of an E-mail is displayed on the display screen.
FIG. 6(c) is a plan view explaining how the image display region is changed in terms of a position and a size, in accordance with contents of information displayed on the display screen of the portable telephone of the folder type of the first embodiment of the present invention. Illustrated in FIG. 6(c) is a case where states of a mail, a date, a memorandum, and a schedule are displayed on the display screen.
Figure 6:
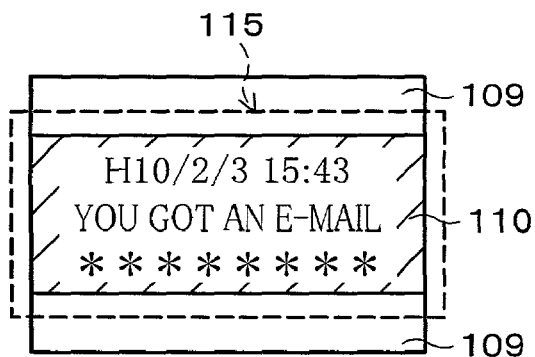
Figure 6:
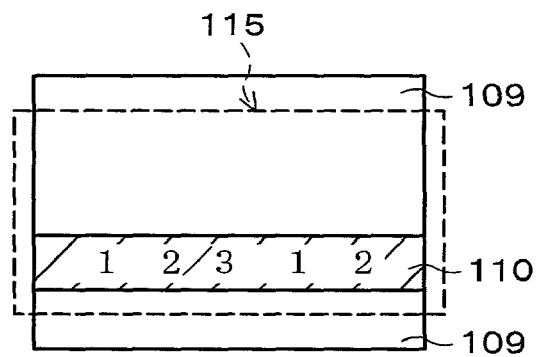

Shown in FIGS. 6(a) to 6(c) are examples in which the positions and the sizes of the image display region 110 and the non-image region 109 are varied in accordance with the contents of the information to be displayed. FIG. 6(a) illustrate a case where the information displayed on the display screen 100 (see FIG. 3) is date and time, while FIG. 6(b) shows a case where the information is a notice for an arrival of an E-mail, and FIG. 6(c) illustrates a case where the information is states of a mail, a date, a memorandum, and a schedule. As shown in FIGS. 6(a) to 6(c), it is unnecessary that the whole recognizable region 115, which can be seen, becomes the image display region 110, provided that only the region necessary to display the information, which is included in the recognizable region 115, becomes the image display region 110.

Figure 7:
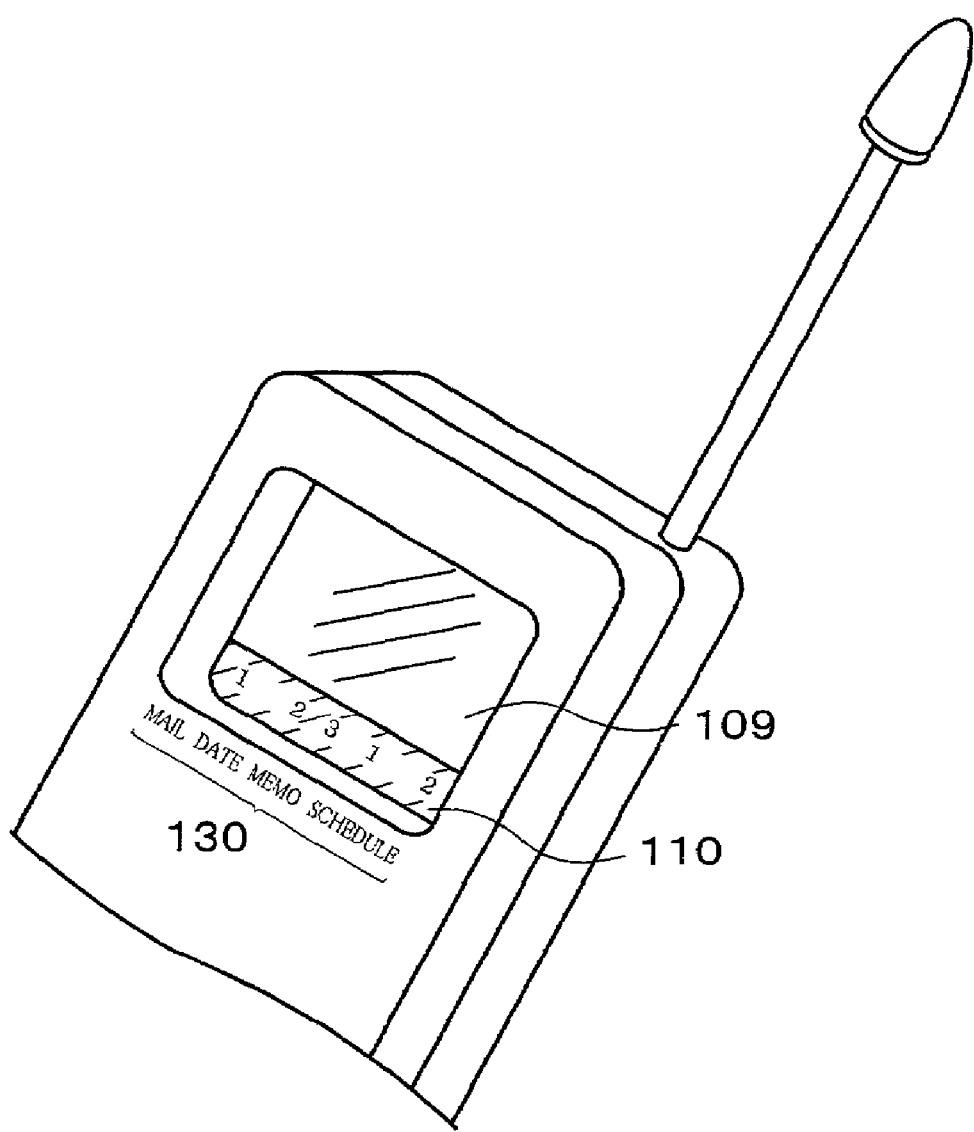
FIG. 7 is a perspective view illustrating a portable telephone of the folder type whose main body is provided with an information explaining section that shows contents of information displayed on the display screen.

As shown in FIG. 7, it is preferable that an information explaining section 130 for indicating the contents of the information is provided in the main body of the portable telephone. The information explaining section 130 indicates the contents of the information in accordance with the information displayed in the image display region 110 of the display screen 100. As shown in FIG. 7, in case states of the mail, date, memorandum and schedule are indicated by numerals or icons in the image display region 110, the numerals or icons are related (matched) with the display of the information explaining section 130 shown on the main body of the portable telephone. This makes it easier to understand the contents of the information displayed on the image display region 110. In addition, the non-image region 109 includes a rest of the display screen 100 except the image display region 110.

It may be so arranged that the recognizable region 115 of the display screen 100 is composed of plural regions divided in advance (divisional regions), so that the region can be selected to be the image display region 110 in accordance with the contents of the information to be displayed. For example, as shown in FIGS. 8(*a*) and 8(*b*), it may be so arranged that the recognizable region 115 is divided into two regions (windows) in advance so that one of the region is selected as the image display region 110, in accordance with the contents of the information to be displayed.

For example, where a first display region 140 and a second display region 141 are respectively a region to display a schedule, and a region to display a telephone number display, when the schedule is to be displayed, only the first display region 140 becomes the image display region 110 as shown in FIG. 8(*a*), while, as shown in FIG. 8(*b*), only the second display region 141 becomes the image display region 110 when the telephone number is to be displayed. In this way, it is possible to vary the image display region 110 and non-image display region 109 in accordance with the information to be displayed.

In addition, it is possible that a plurality of pieces of the information are respectively displayed in the first display region 140 and the second display region 141. Alternatively, the information, which is one piece, may be displayed by using both of the first display region 140 and the second display region 141.

It is possible to automatically change the size and position of the image display region 110, for example, in accordance with a judgement result as to the display information by a display information judgement section (not shown). Meanwhile it is also possible to change the size and position of the image display region 110 according how a switchover switch (not shown) is operated. Note that, the display information judgement section is used for judging the contents of the information to be displayed, and is realized by using a CPU and the like, for example. Meanwhile, the switchover switch is use to switch over the display regions or the display information.

With reference to FIGS. 9 through 14, explained below is a driving circuit for the display section, and a driving method for driving the display section, which can produce a non-display state in a such a simple method in which all the scanning lines in the region not to display in the display screen are scanned at the same time, while the arbitrary gradation voltage is applied into the data signal lines, so as to produce the non-display state.

Note that, in the explanation below, it is assumed that the portable information apparatus of the present invention has such a display screen that displays separately the non-image region (hereinafter, referred to as a non-displayed part) and the image display region (hereinafter, denoted as a displayed part), and the non-displayed part is set to have a single color.

Figure 10:
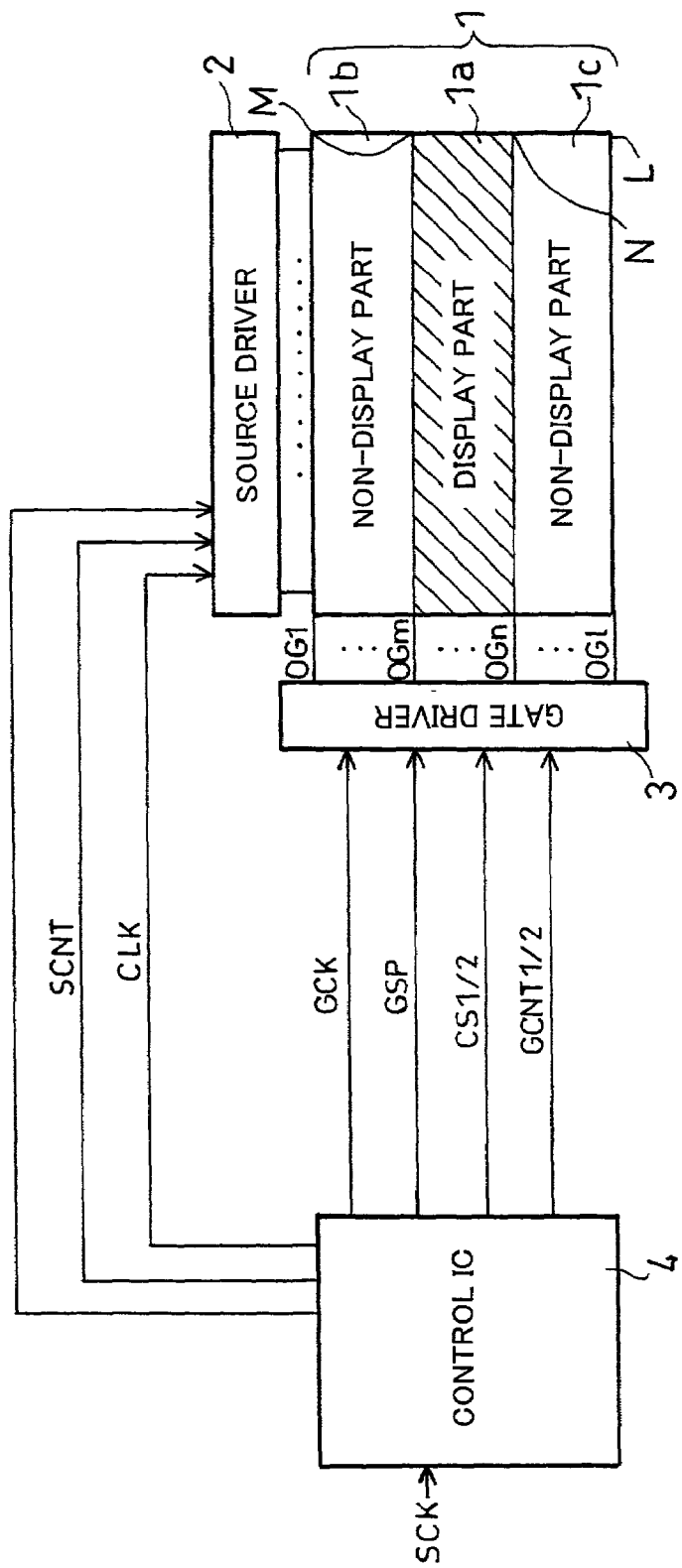
FIG. 10 is a block diagram showing a circuit arrangement of a display section having the scanning signal line driving section of the portable information apparatus of the present invention.

The image display apparatus having the display screen is, as shown in FIG. 10, provided with a liquid crystal panel (display section) 1, a source driver (driving section, data signal line driving section) 2 for driving each data line of the liquid crystal panel 1, a gate driver (driving section, scanning signal line driving section) 3 for driving each scanning signal line of the liquid crystal panel 1, and a control IC (control section, setting section) 4 for controlling the source driver 2 and the gate driver 3 so as to display an image on the liquid crystal panel 1 in accordance with a display data.

The liquid crystal panel 1 is provided with the data signal lines and the scanning signal lines so that each of the data signal lines and each of the scanning signal lines cross, at a right angle, in a lattice-like manner. In between each crossing point of each data signal line and each scanning line, a liquid crystal layer is formed respectively as each pixel in a matrices-like manner.

The source driver 2 is provided with shift resistors that correspond to the respective data signal lines. The shift resistors convert the display data in serial to a data signal for display, which is parallel, in accordance with a clock CLK, and hold the data signal for display, so that the source driver 2 outputs the converted data signal for display in parallel to the respective data signal lines in a synchronized manner in accordance with a horizontal synchronizing signal (horizontal period).

Moreover, the source driver 2 is provided with operational amplifiers as buffers in each output stage of each shift resistor. With the respective operational amplifiers, it is possible to match and reduce an output impedance and to stabilize an output voltage, with respect to the data signal for display that is transmitted from the source driver 2 to each data signal line.

The gate driver 3 applies an ON signal (scanning signal for display) into each pixel on the scanning signal lines, in accordance with a gate start pulse GSP, which is synchronized with a vertical synchronizing signal included in the display data, and a gate clock GCK, which is synchronized with the horizontal synchronizing signal. The application of the ON signal into the respective scanning signal lines is carried out in a stepwise manner (that is, in a scanning manner, from a top scanning signal line to a bottom scanning signal line).

Figure 9:
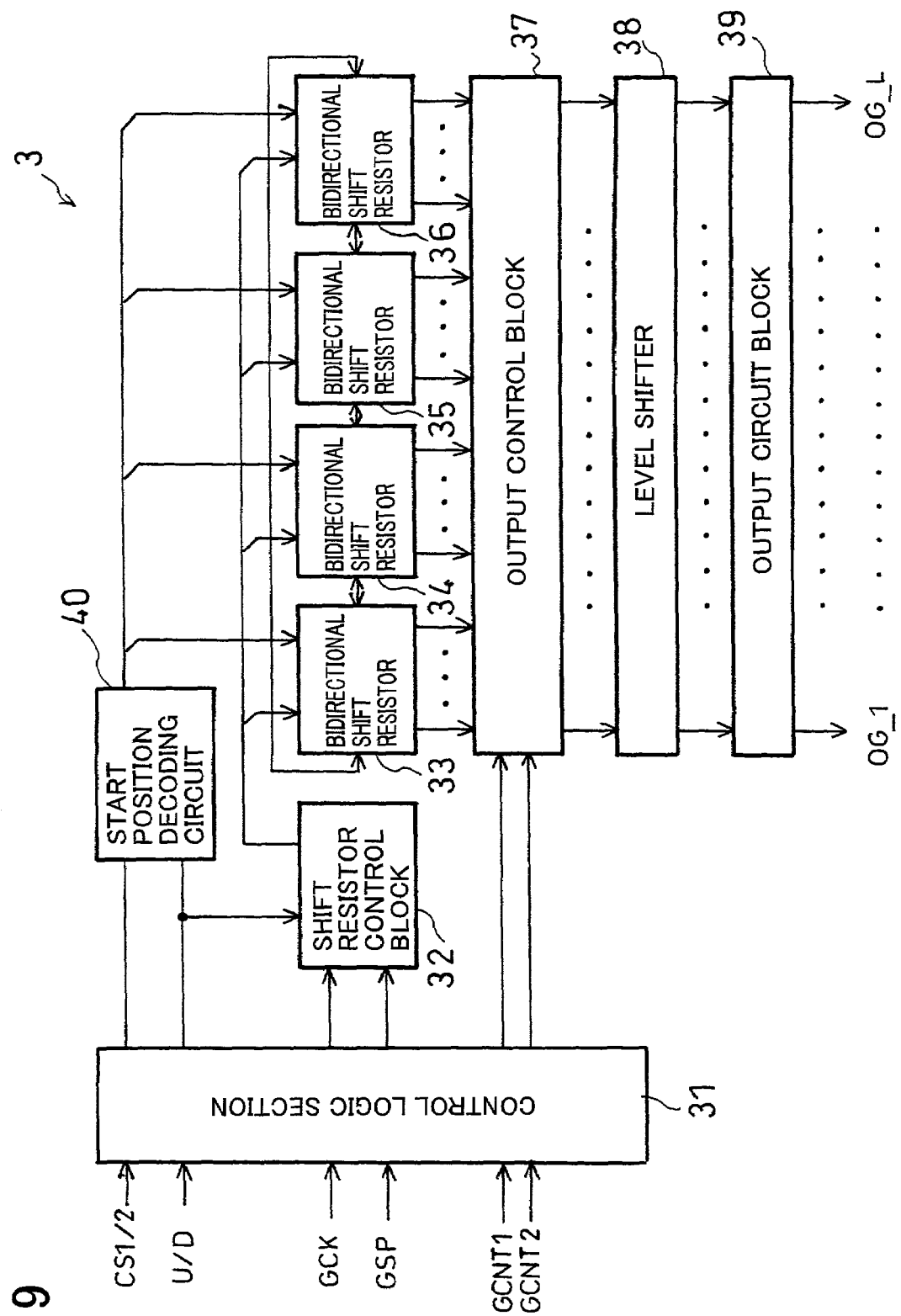
FIG. 9 is a block diagram illustrating a circuit arrangement of a scanning signal line driving section that drives the display section of the portable information apparatus of the present invention.

Next, described is a detailed example of a circuit of the gate driver 3. As shown in FIG. 9, the gate driver 3 is provided with a control logic section 31, a shift resistor control block 32, and plural, for example, four shift resistors 33 to 36.

For example, if a number of the scanning signal lines is 240, the respective shift resistors 33 through 36 are respectively provided with sixty of shift resistors (which will be described later), in accordance with the number of the scanning signal lines. Moreover, because the respective shift resistors 33 to 36 are connected with each other in series, the respective shift resistors 33 to 36 respectively output the pulse signal for scanning (scanning pulse signal: for example, a pulse that changes from a high level to a low level and back to the high level), which are for outputting the ON signal to the respective signal line, at a timing of the stepwise manner based on the gate clock GCK.

A shift resistor control block 32 carries out the following steps ①  through ③: Step ①  for supplying the gate clock GCK to the respective shift resistors 33 through 36; Step ②  for outputting a reset signal to the respective shift resistors 33 through 36, in accordance with the gate start pulse GSP, and; step ③  for starting, in the stepwise manner, to output the scanning pulse signal into the respective scanning signal lines in accordance with the gate start pulse GSP and the gate clock GCK. The scanning pulse signal is for outputting the ON signal.

Furthermore, the gate driver 3 is provided with (1) an output control block 37, which receives the respective scanning pulse signals from the respective shift resistors 33 to 36, (2) a level shifter 38 for adjusting each output voltage level from the output control block 37 so as to be the ON signal for each scanning signal line, (3) an output circuit block 39 that is provided with each operational amplifier that optimizes output conditions with respect to each ON signal from the level shifter 38, for example, by adjusting the output impedance or an output current value.

The output control block 37 outputs steadily the respective scanning pulse signals, which are inputted from the respective shift resistors 33 through 36, as pulse signals of a high level. Meanwhile, once the pulse signal of the high level is outputted, the output control block 37 steadily outputs, for example, a signal of a low level, until the reset signal is inputted.

Figure 11:
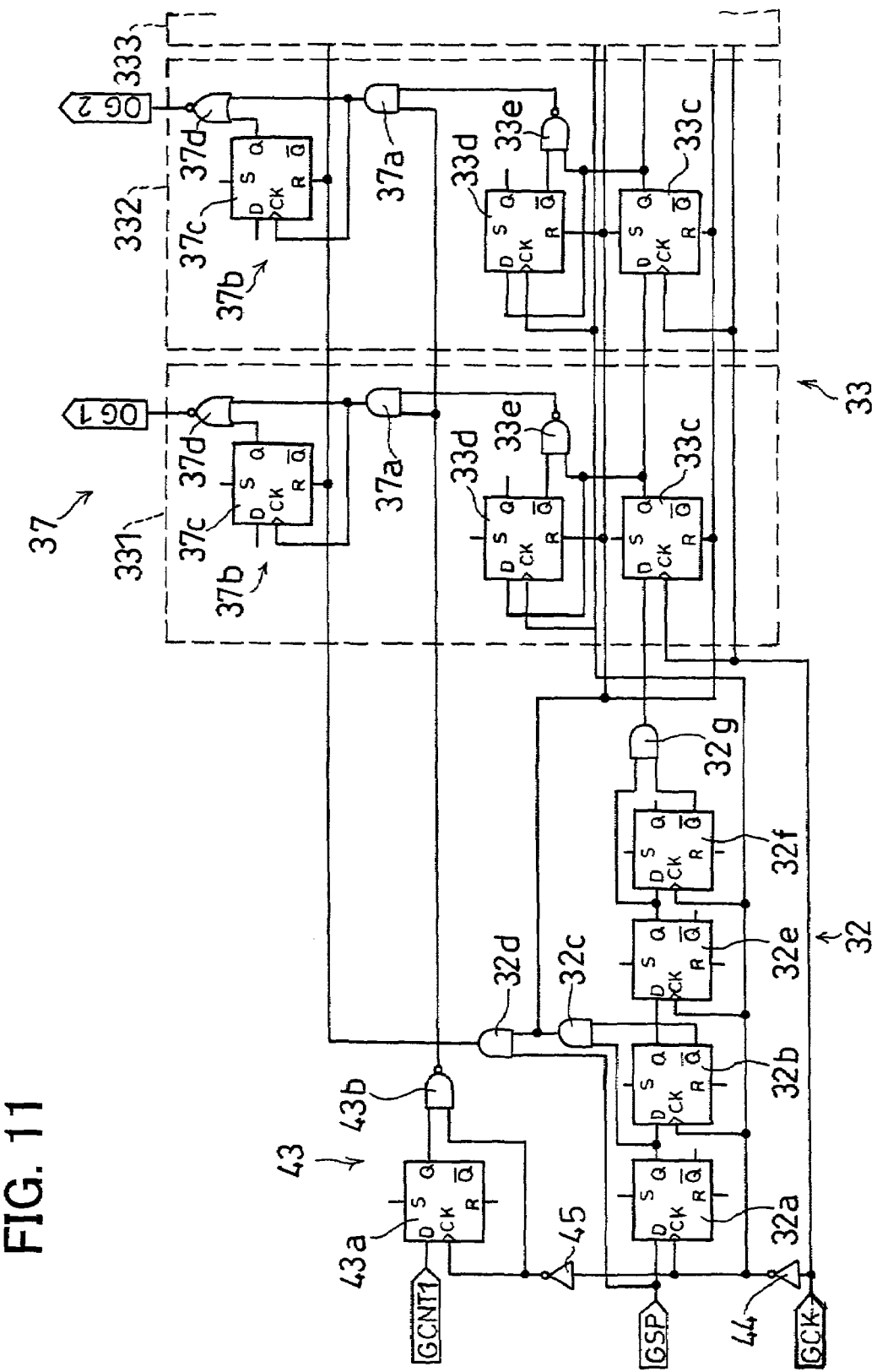
FIG. 11 is a block diagram illustrating a main part of a circuit arrangement of the scanning signal line driving section.

For this reason, the output control block 37, for example as shown in FIG. 11, is provided with a D flip-flop 37c, a NOR circuit 37d, in accordance with each scanning signal line. The D flip-flop 37c has a CK terminal that usually receives the pulse signal of the high level all the time, and a D terminal that receives a VDD signal, which is a high level signal. Meanwhile, the D flip-flop 37c also has a Q terminal whose output is set at the low level in accordance with the reset signal.

The NOR circuit 37d has a first input terminal that receives the output from the Q terminal of the D flip-flop 37c, and a second input terminal that receives the signals from the shift resistors 33 to 36.

In the thus arranged output control block 37, in general, the output from the NOR circuit 37d is maintained at the low level, because the output control block 37 receives the high level signal from the shift resistors 33 to 36.

On the other hands, the output control block 37 is so arranged that the NOR circuit 37d outputs the pulse signal of the high level in accordance with the scanning pulse signals, when the scanning pulse signals (which change their levels to the low level once, and then change back the levels to the high level) from the shift resistors 33 to 36 are received.

In short, during a fall time of the scanning pulse signal (a rise time of an output of an AND circuit 37a, which will be explained later), in the D flip-flop 37c, the output of the Q terminal is changed to the high level. By taking advantage of the time lag of the change, in the NOR circuit 37d, the first and the second input terminals are changed to the low level while the AND circuit 37a is at the low level. In this way, the pulse signal of the high level is outputted in accordance with the scanning pulse signal.

Thereafter, the first input terminal of the NOR circuit 37d receives, all the time, the high level signal from the Q terminal, until the D flip-flop 37c receives the reset signal. Therefore, the output from the NOR circuit 37d maintains its level at the low level.

In the thus arranged liquid crystal display apparatus, each pixel of the liquid crystal panel 1 is set to be a charged pixel or an uncharged pixel by each scanning line, which is selected in the stepwise manner within one frame period (a pulse interval of the vertical synchronizing signal, for example, 60 Hz). The charge pixel is charged by the scanning signal lines, in which the ON signal has been applied, and each data signal line, which receives the data signal for display that is based on the display data. In this way, it is possible to intercept the light, which passes through a liquid crystal layer of each pixel, so as to display on the liquid crystal panel 1 an image that is based on the display data.

Moreover, the liquid crystal display apparatus, as shown in FIG. 10 for example, has a partial display function so as to display on the display screen of the liquid crystal panel 1 in such a manner that the display screen of the liquid crystal panel 1 is divided, in a longitudinal direction of each data signal line (a vertical direction of the display screen of the liquid crystal panel 1), into respective non-display parts 1b and 1c, and a display part 1a. While FIG. 10 illustrates the example where the display part 1a is sandwiched by each non-display parts 1b and 1c, it is also possible to have an arrangement where the display screen is divided into two parts, that is, into the non-display 1b and the display part 1a, or into the display part 1a and the non-display part 1c.

In order to realize the partial display function, the gate driver 3, as shown in FIG. 9, is provided with a start position decoding circuit 40 between the control logic section 31 and the respective shift resistors 33 to 36, while the output control block 37, as shown in FIG. 11, is provided with an input section (input means) 43 for performing a batch output, and the AND circuit (control means) 37a. The input section 43 and the AND circuit 37a function as a scanning region judging section.

Moreover, the source driver 2 is provided with a source driver stopping means, which is not shown here. The source driver stopping means stops the source driver 2 from operating after the data signals for display, which are respectively for the respective non-display parts 1b and 1c, are outputted once to the respective non-display parts 1b and 1c, until a next time when the display part 1a is started, or until a next time when the gate start pulse GSP (vertical synchronizing signal) is inputted.

An example of such a source driver, is source driver stopping means for stopping the supply of the clock CLK at a side from which the clock CLK for is outputted to the source driver 2. The source driver stopping means stops the supply of the clock CLK in accordance with the source control signal and the like. Moreover, given as an example of the source driver stopping means is means that inputs the clock CLK into a first input terminal of the AND circuit, while the means inputs into a second input terminal a High level usually, but a Low level during a stopping time. In this manner, the means stops, for a predetermined time, the input of the clock CLK into the source driver 2. Moreover, the gate driver 3 is also provided with gate driver stopping means, which is similar to the source driver stopping means. The gate driver stopping means is controlled in accordance with, for example, a GCNT2 signal.

The start position decoding circuit 40 controls the respective shift resistors 33 through 36 in accordance with each CS ½ signal and a U/D signal, which are control signals, so as to control (select) from which one of the shift resistors 33 to 36 is started to operate (which one of the shift resistors 33 to 36 receives an enable signal of the gate start pulse GSP). Moreover, the start position decoding circuit 40 can stop the supply of the data clock GCK at one of the shift resistors 33 to 36, so as to stop the rest of the shift resistors 33 through 36 from operating.

Furthermore, the start position decoding circuit 40 selects a necessary one of the shift resistors 33 to 36, in accordance with the reset signal and the interception of the gate clock GCK, so as to operate only the necessary one of the shift resistors 33 to 36 is operated, while the start position decoding circuit 40 stops the rest of the shift resistors 33 to 36 from operating, for example, by stopping the output of the gate clock GCK (fixing the gate clock GCK at the high level or the low level). The U/D signal has a function, for example, to switch over the scanning direction of the shift resistors 33 to 36.

The input section 43 generates a pseudo scanning pulse signal (see FIG. 11), which is similar to the scanning pulse signal, in accordance with the input of a gate control signal GCNT1, which is a mode signal for instructing each scanning signal line of the respective non-display parts 1b and 1c to output the ON signal in the batch manner. The AND circuit 37a is switchover means that outputs a pulse signal that corresponds to the pseudo scanning pulse signal or each scanning pulse signal from each shift resistor 33 to 36, when the pseudo scanning pulse signal or the scanning pulse signal is inputted. The AND circuits 37a are respectively provided between the respective shift resistors 33 to 36 and the output control block 37, in accordance with each scanning signal line.

The gate driver 3 (see FIG. 9), because the gate driver 3 is provided with the input section 43 and the AND circuit 37a, can perform the display in a single color, for example, in a white color (single-colored display). In order to perform the single-colored display, the gate driver 3 outputs, in the batch manner and at once, the ON signal to each scanning signal line that corresponds to the non-display parts 1b and 1c, while the source driver 2 outputs, in only one time, to the respective data signal lines the data signals for display, which are for the non-display parts 1b and 1c, for displaying the whole respective non-display parts 1b and 1c of the liquid crystal panel 1. The respective non-display parts 1b and 1c are unscanned region that is predetermined in accordance with the mode signal.

Here, data signals for display for the non-display parts 1b and 1c are supplied to apply a voltage in a plurality of the pixels with respect to one data signal line, so as to charge the pixels. There are some cases that the applied voltage is not enough to charge the pixels when the application of the voltage is carried out for a period of time that is similar to a period of time for the usual time. However, such insufficient charging occurs in each pixel in an identical manner, so that color nonuniformity in the non-display parts 1b and 1c is not so severe, causing no serious problem. But, in order to ensure a quantity of the voltage for charging the pixels in the non-display parts 1b and 1c, it may be so arranged that the period of time for applying the voltage into the respective pixels is set to be longer than that of the usual time, by extending a cycle time of a system clock SCK, thereby making the frequency of the data signal for display lower, so that the gate clock GCK has a longer pulse width.

Furthermore, with the above arrangement, it is possible to achieve low electricity consumption of the portable information apparatus with ease, because, once the data signals for display for the non-display parts 1b and 1c are outputted from the source driver 2, the source driver 2 and the gate driver 3 are stopped from outputting, that is, stopped from operating until a time when a next display part 1a is scanned. In other words, in the liquid crystal display apparatus, usually 70 to 80% of the electricity consumption of the liquid crystal panel 1 is consumed by each operational amplifier of the source driver 2. Therefore, because there is a period in which the source driver 2 is stopped, it is possible to reduce the electricity consumption surely, compared with a conventional portable telephone, even if the conventional portable telephone has the partial display function.

Next, explained is operation of a liquid crystal display apparatus, in which the gate driver 3 of the present invention is used. To be begin with, discussed is an example where the partial display driving is realized between an M th output terminal and an N th output terminal of the liquid crystal panel 1 in such a manner that, as shown in FIG. 10, a number of the scanning signal lines provided in the liquid crystal panel 1 and a number of the output terminals (a number of the scanning signal lines) provided in the gate driver 3 are an L number (where L is an integer).

As shown in FIG. 9, because the start position decoding circuit 40 of the gate driver 3 has a function to select one shift resistor among from the four shift resistors 33 through 36 in accordance with the CS ½ signal, the output starting position of the gate driver 3 can be set to have an L/4 interval. In this case, the output starting position of the gate driver 3 can be set in accordance with the following position:

$$a \times (L/4) < M < (a+1) \times (L/4),$$

where a is a natural number. With the above equation, the a is calculated out. The output starting position of the gate driver 3 can be set from $[(a \times L \div 4)+1]$th, that is, the shift resistors 33 to 36 unit each, in accordance with the a that has been thus calculated out. For example, where L=240, and M=100, the value of a is 1. Therefore, the output starting position of the gate driver 3 is 61th, in the other words, the shift resistor 34.

Figure 12:
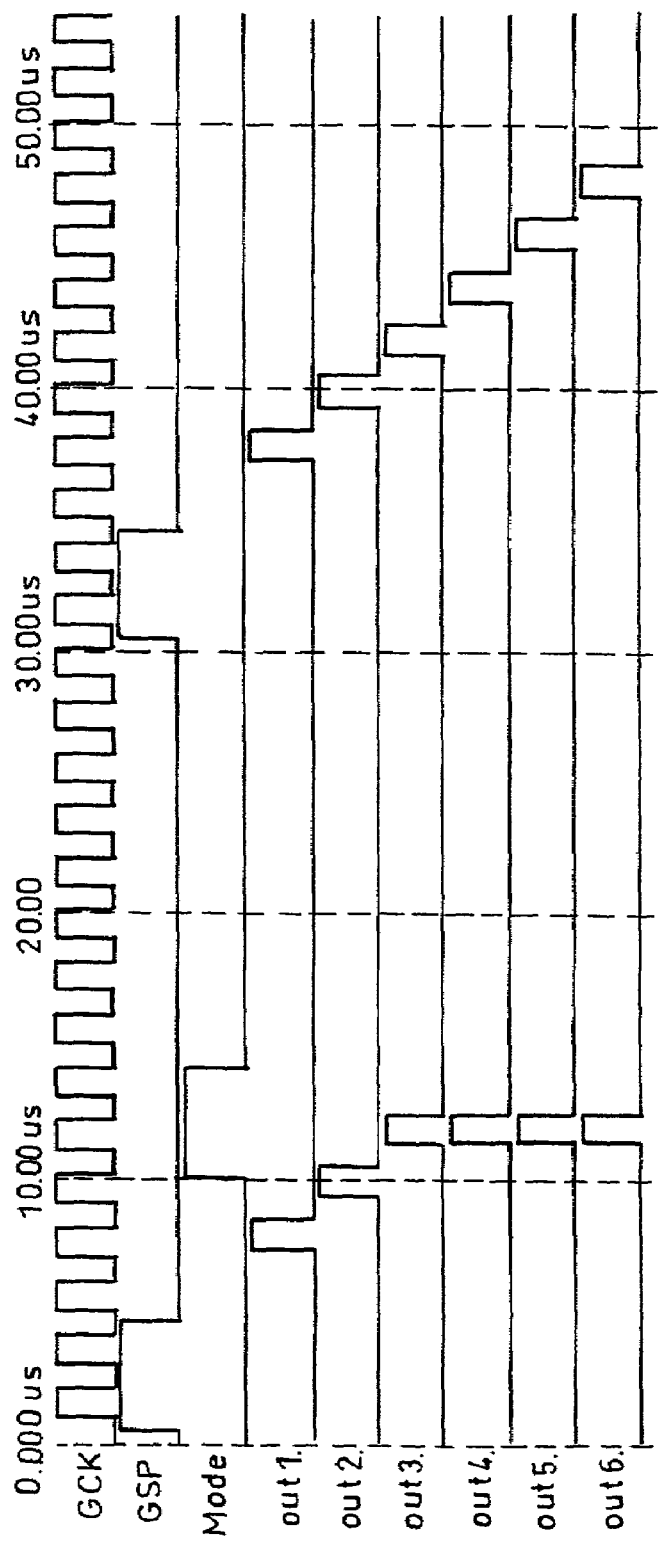
FIG. 12 is a timing chart illustrating output timing of each signal in case of batch output (one horizontal period) and stepwise output performed by the scanning signal line driving section.
Figure 13:
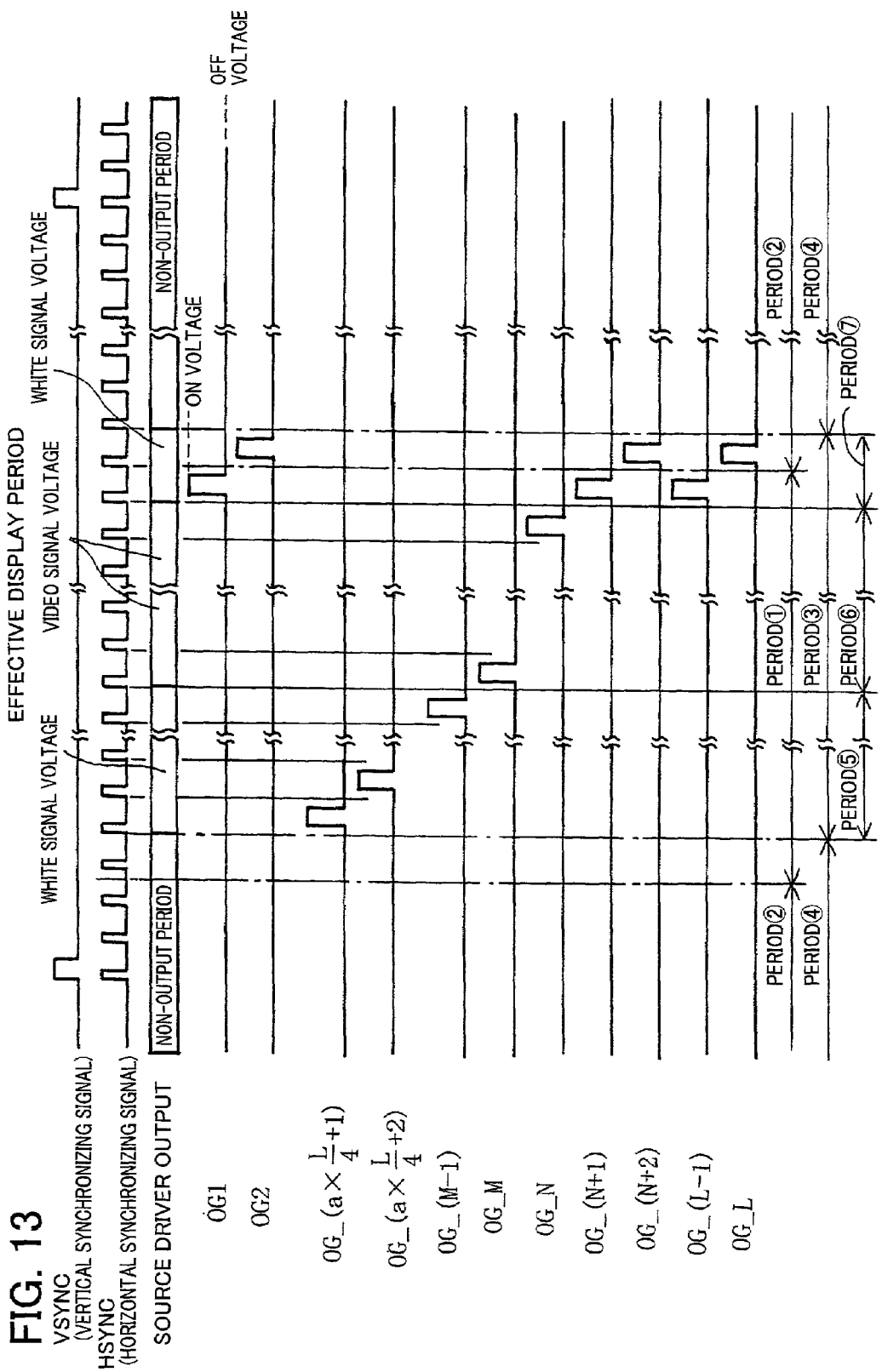
FIG. 13 is a timing chart illustrating output timing of each signal in case of batch output (two horizontal periods) and stepwise output performed by the scanning signal line driving section.

Here, as shown in FIGS. 12 and 13, while the scanning from $[(a \times L \div 4)+1]$th to the N th is carried out, the shift resistor 34 in the gate driver 3 is counted up every horizontal period, in the same fashion as the usual case. However, from $[(a \times L \div 4)+1]$th to (M−1)th, it is the non-display part 1b. Therefore, the output of the source driver 2 is a voltage for the white display. In FIG. 12, illustrated is an example where the ON signal is outputted in batch to the respective scanning signal lines of the non-display parts 1b and 1c during one horizontal period, while in FIG. 13 shown is an example where the ON signal is outputted in batch to the respective scanning signal lines of the non-display parts 1b and 1c during two horizontal periods. (Hereinafter, output terminals may be referred in two groups, namely odd-numbered output terminals (which are numbered with odd numbers, such as first, 11th, 61th) and even-numbered output terminals (which are numbered with even numbers, such as second, 12th, 60th)).

After the scanning is completed until the N th, in accordance with a Mode signal, which is the GCNT1 signal, an ON pulse is outputted from all the odd-numbered output terminals to those output terminals of the gate driver 3 that have not outputted, in one horizontal period, while all the even-numbered output terminals outputs the ON pulse at once, in a next horizontal period (see FIG. 13). In FIG. 13, illustrated is a case where the shift resistors 33 and 36 among the respective shift resistors 33 to 36, which includes all the scanning signal lines in the respective non-display parts 1b and 1c, are turned ON in batch and scanned in batch.

In FIG. 13, respective periods ① to ⑦ indicate the following matters are carried out. The period ① is a period necessary for the source driver 2 to carry out sampling operation (operation for converting a serial data for display to a parallel data for display, and holding the parallel data for display). The period ② is a period for the sampling operation of the source driver 2 to be stopped. The period ③ is a period necessary for the source driver 2 and the gate driver 3 to output. The period ④ is a period for the source driver 2 to stop the output and for the gate driver 3 to fix OFF output. The period ⑤ is a period for the source driver 2 to write a white signal voltage in the non-display part 1b. The period ⑥ is a period for the source driver 2 to write the data signal for display (a video signal in an effective display period) in the display part 1a. The period ⑦ is a period in which the white signal voltages are written in the non-display parts 1b and 1c in batch.

The output from the source driver 2 is also a voltage for the white display during the two horizontal periods. The applied voltage for the white display is inverted, that is, is subjected to A.C. driving, so as to prevent baking of the liquid crystal layer or flickering of the display in each pixel of the liquid crystal panel 1. In case where it is unnecessary to take the baking in consideration, it may be so arranged that, as shown in FIG. 12, the ON signal is outputted to all of the scanning signal lines, which correspond to the non-display parts 1b and 1c, in one horizontal period, so as to make the output of the source driver 2 be the voltage for the white display.

Then, until a display of a next frame is started, a SCNT signal is controlled so as to stop the output of the source driver 2, and the output of the gate driver 3 is set to be fixed to be OFF in accordance with the GCNT2 signal, while logic parts of the gate driver 3 and the source driver 2 are stopped from operating. In this way, operation times of the source driver 2 and the gate driver 3 are calculated by an equation: (N−a×L÷4+1)÷L, where the source driver 2 and the gate driver 3 are turned ON in batch in one horizontal period, while the operation times are calculated by an equation: (N−a×L÷4+2)÷L, where the source driver 2 and the gate driver 3 are turned ON in batch in two horizontal periods. This reduces the electricity consumption of the portable information apparatus.

Moreover, in the display part 1a, it is necessary that the writing cycle (refresh rate) for writing the data signal for display (video signal) in the liquid crystal layer of the liquid crystal panel 1 is a cycle in accordance with contents to be displayed. For example, in case displayed is a dynamic image in accordance with NTSC (National Television System Committee, a number of scanning lines: 525, 30 frames per second) or the like, the cycle is 60 Hz, at least. On the other hand, the respective non-display parts 1b and 1c are fixed to be a white single-colored display, as the present embodiment. Therefor, it is possible to make a frequency of the refresh rate lower than that of the non-display part 1a. Thus, the low frequency of the refresh rate can reduce the electricity consumption of the portable information apparatus and stabilize the display operation of the portable information apparatus.

However, it is necessary that the data signal for display (video signal) to be written has a polarity that is opposite to a previous data signal for display (video signal). Moreover, the non-display parts 1b and 1c may have low frequency, provided that each liquid crystal layer of the liquid crystal panel 1 is so polarized to cause no baking nor flickering.

Described above is the case, as shown in FIG. 13, where the respective non-display parts 1b and 1c are turned ON in batch so as to scan the unscanned parts in batch lest that an upper part of the display part 1a and a lower part of the display part 1a have the scanning signal lines different in the refresh rate, thereby preventing the display part 1a from being unevenly displayed.

In addition, for the sake of further reduction in the electricity consumption, for example, a shift resistor, which displays at least a part of the non-display part 1b and at least a part of the display part 1a, may be so arranged that the shift resistor outputs the ON signal in batch so that the liquid crystal panel 1, which corresponds to the shift resistor, has the single-colored display on the screen, then each scanning signal line, which corresponds to the display part 1a of the shift resistor, is scanned in an appropriate timing so as to perform the display usually.

This extends the period for the source driver 2 and the gate driver 3 to stop, thereby further lowering the electricity consumption of the portable information apparatus. In this case, at least a part of the non-display part 1a is turned ON in batch once, then the data signal for display is written again in the part of the non-display part 1a in the stepwise manner, thereby causing a difference between the upper and the lower parts of the display part 1a in terms of the refresh rate. This gives the display part 1a of the liquid crystal panel 1 a gradation in the brightness. However, this does not adversely affect visibility of the display of the display part 1a, especially in case the display part 1a is small in size.

In addition, in the present embodiment, discussed as the liquid crystal panel 1 is the TFT liquid crystal panel of the active matrix type. However, the liquid crystal panel 1 is not limited to the above arrangement. For example, a liquid crystal panel of a MIM (Metal Insulator Metal) type, or a flat display such as an electroluminescence may be employed as the liquid crystal panel 1.

In the following, explained in detail is the input section 43. As shown in FIG. 11, the input section 43 is provided with a D flip-flop 43a, and an NAND circuit 43b. The D flip-flop 43a has a D terminal that receives the gate control signal GCNT1, and a CK terminal that receives the gate clock GCK via inverters 44 and 45, shortly after the reception of the gate control signal GCNT1 by the D terminal. The D flip-flop 43a also has a Q terminal whose output is received by a first input terminal of the NAND circuit 43b. Moreover, a second input terminal of the NAND circuit 43b receives the gate clock GCK.

In this way, the input section 43 generates the pseudo scanning pulse signal in accordance with the gate control signal GCNT1, which is at the High level, for example. In short, when the gate control signal GCNT1 is at the Low level, the output of the Q terminal of the D flip-flop 43a is maintained at the Low level, regardless of whether the gate clock GCK is at the low level or the high level. Therefore, the output of the NAND circuit 43b is at the High level. On the other hand, when the gate control signal GCNT1 is at the high level, the output of the Q terminal of the D flip-flop 43a is changed to the High level, in a rise time of the gate clock GCK. When the gate clock GCK is at the High level, the output of the NAND circuit 43b is at the Low level, thereby the output of the NAND circuit 43b being the pseudo pulse signal.

Moreover, in general, because the gate control signal GCNT1, as the mode signal, is a pulse signal that is maintained at the High level for a length equal to about two cycles of the gate clock GCK, one pseudo scanning pulse signal is outputted in accordance with the gate control signal GCNT1.

In the following, provided is further detailed explanation on the shift resistor control block 32 and the shift resistors 33 to 36. Note that, the shift resistors 33 to 36 are identical with each other, being composed of an identical circuit inside. Therefore, only a part of the shift resistor 33 is explained below.

To begin with, the shift resistor control block 32 is, as shown in FIG. 11, two D flip-flops 32a and 32b, and two AND circuits 32c and 32d, for outputting the reset signal.

The D flip-flop 32a has a D terminal that receives the gate start pulse GSP, and a CK terminal that receives the gate clock GCK, which has been inverted by the inverter 44. The D flip-flop 32b has a D terminal that receives an output of a Q terminal of the D flip-flop 32a, and a CK terminal that receives the gate clock GCk, which has been inverted by the inverter 44.

The AND circuit 32c has a first input terminal that receives the output of the Q terminal of the D flip-flop 32a, while a second input terminal of the AND circuit 32c receives an output of a Q bar terminal of the D flip-flop 32b. When this changes the gate start pulse GSP from the Low level to the High level, if the output of the Q terminal of the D flip-flop 32a is changed from the Low level to the High level, the output of the Q bar terminal of the D flip-flop 32b is changed from the High level to the Low level after a delay at the D flip-flop 32b is passed.

Therefore, each input terminal of the AND circuit 32c receives an input of the High level respectively, within the delay at the D flip-flop 32b (a time lag). Thus, the AND circuit 32c outputs a pulse signal, which is smaller than a pulse width of the gate start pulse GSP, as the reset signal for the shift resistors 33 to 36, in accordance with the gate start pulse GSP.

Moreover, the AND circuit 32d has a first input terminal that receives the gate start pulse GSP, and a second input terminal that receives an output of the AND circuit 32c. In this way, the AND circuit 32d outputs a pulse signal, which is similar to the reset signal, as the reset signal for the output control block 37, in accordance with the gate start pulse GSP.

Furthermore, the shift resistor control block 32, is provided with two D flip-flops 32e and 32f and an AND circuit 32g, so as to start the shift resistors 33 through 36 to output the ON signal in the stepwise manner.

The D flip-flop 32e has a D terminal that receives an output of the Q terminal of the D flip-flop 32b, and a CK terminal that receives the gate clock GCK, which has been inverted by the inverter 44. The D flip-flop 32f has a D terminal that receives an output of the Q terminal of the D flip-flop 32e, and a CK terminal that receives the gate clock GCk, which has been inverted by the inverter 44.

The AND circuit 32g has a first input terminal that receives an output of the Q terminal of the D flip-flop 32e, and a second input terminal that receives an output of a Q bar terminal of the D flip-flop 32f. Because of this, an output of the AND circuit 32g is outputted to the shift resistor 33, in accordance with the pulse signals of the High level from the D flip-flop 32b and the AND circuit 32c as starting signals for the output of the AND circuit 32g. The starting signals are outputted with a delay of a predetermined period of time, which is caused because the starting signals have passed through the D flip-flops 32e and 32f. The output of the starting signals is in accordance with the reset signal from the respective AND circuit 32c and 32d. Therefore, it is possible to stabilize the output of the ON signal from the shift resistors 33 to 36 in the stepwise manner, which is in accordance with the gate clock GCK.

Next, the shift resistor 33 is provided with two D flip-flops 33c and 33d and an NAND circuit 33e, for outputting an instruction signal in accordance with initiation by the gate clock GCK, so as to output the ON signal in the stepwise manner.

The D flip-flop 33c has (1) a D terminal that receives an output of the AND circuit 32g (which is usually at the Low level, while the AND circuit 32g receives the pulse signal of the High level that is in accordance with the gate clock GCK), (2) a CK terminal that receives the gate clock GCK, and (3) an R (reset) terminal that receives the output of the AND circuit 32c.

The D flip-flop 33d has (1) a D terminal that receives an output of the Q terminal of the D flip-flop 33c, (2) a CK terminal that receives the gate clock GCK that has been inverted by the inverter 44, and (3) an R (resect) terminal that receives an output of the AND circuit 32c.

The NAND circuit 33e has a first input terminal that receives an output of a Q bar terminal of the D flip-flop 33d, and a second input terminal that receives an output of the Q terminal of the D flip-flop 33c. In this way, even though an output of the NAND circuit 33e is usually at the High level, the NAND circuit 33e outputs an instruction signal of the Low level, which has a pulse width smaller than that of the gate clock GCK, when the NAND circuit 33e receives a pulse signal of the AND circuit 32g.

Furthermore, the shift resistor 33 is respectively provided with the two D flip-flop 33c and 33d, and the NAND circuit 33e in accordance with the number of the scanning signal lines (for example, 60) (in FIG. 11, the shift resistors 33 are labelled as 331, 332, 333, and the like reference numerals). The output of the Q terminal of the D flip-flop 33c is inputted into the D terminal of the next D flip-flop 33d, so that the instruction signal for each ON signal, which is outputted in the stepwise manner, can be outputted in order, in accordance with (a) the delay of the signal by the D flip-flop 33c and (b) the gate clock GCK.

Figure 14:
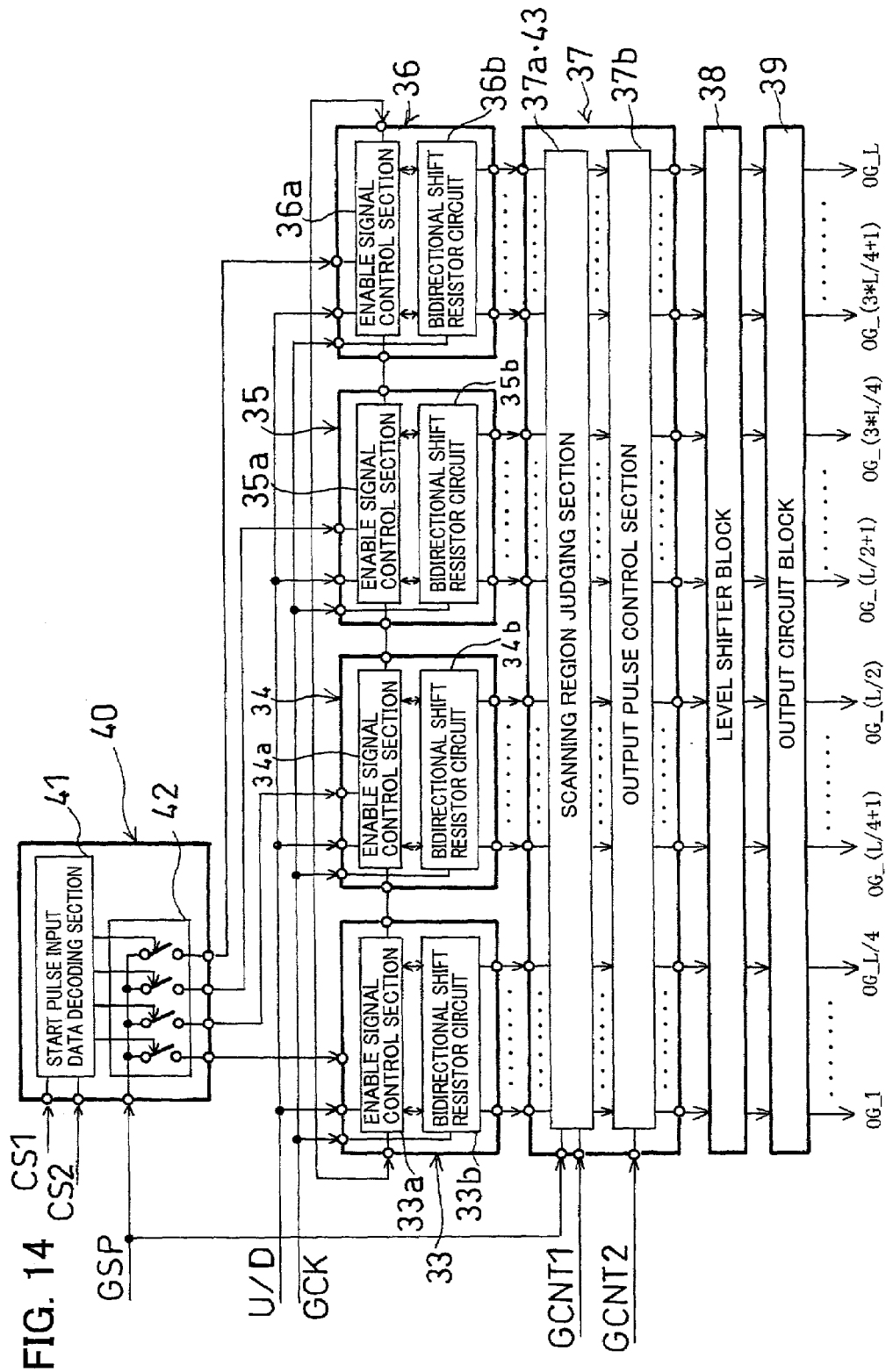
FIG. 14 is a block diagram showing a modification of the scanning signal line driving section.

Note that, described above is the example where the start position decoding circuit 40 is used for selecting the respective shift resistors 33 to 36 in accordance with the interception of the reset signal or the gate clock GCk, which is in accordance with each CS ½ signal and U/D signal as the control signals. However, the present invention is not limited to the above arrangement. For example, as shown in FIG. 14, the start position decoding circuit may be provided with (a) a start pulse input data decoding section 41 for outputting the instruction signal for selecting the respective shift resistors 33 to 36 in accordance with the respective CS ½ signals, and (b) a switching section 42 for switching over the connection between the gate clock GCk with the respective shift resistors 33 through 36, in accordance with the instruction signal.

In this case, the resistors 33 to 36 are respectively provided with bidirectional shift resistor circuits 33b to 36b and enable signal control sections 33a to 36a, where each enable signal control sections 33a to 36a are respectively provided in a preceding stage of respective bidirectional shift resistor circuits 33b to 36b. In this way, the enable signal control sections 33a to 36a output an enable signal (operation starting signal) in order, while omitting counter operation, so as to transmit the scanning pulse signal for the ON signal.

The enable signal control sections 33a to 36a control to supply the enable signal to the bidirectional shift resistor circuit of the first stage, which is selected among from the bidirectional shift resistor circuits 33b to 36b, in accordance with a shift direction of each bidirectional shift resistor circuit 33b to 36b, a start position control signal, and each CS ½ signal. This function makes it possible to change a starting position of the bidirectional shift resistor circuits 33b to 36b. Therefore, it is possible to reduce a region which requires usual scanning, even though the region is included in the non-display parts 1b and 1c.

With the above arrangement, where the display screen 100 is provided with the non-image region 109 that consumes less electricity when the portable telephone is in the folded state, it is possible to reduce the electricity consumption of the display section. This can achieve both a high image quality and low electricity consumption at the same time for the color display and the dynamic display and the like on the display screen 100. Furthermore, because the various information displayed on the image display region 110 of the display screen 100 can be checked when the portable information apparatus is in the folded state, it is possible to check the various information even during the call wait time.

A portable information apparatus of the present invention, is a portable information apparatus of a folder type, which includes a display screen for displaying information, a speaker, and an antenna on the upper main body, and has an operation button and a microphone on the lower main body, which are exposed on an upper main body and a lower main body when a folding and unfolding section is unfolded. The portable information apparatus may be so arranged to be provided with a transparent section on at least a part of the lower main body, so that a part of information displayed on the display screen can be seen when the folding and unfolding section is folded, wherein only a part of the display screen is displayed while a driving circuit for the rest of the display screen is stopped so as not to display the rest of the display screen, when the part of the information displayed on the display screen is checked while the folding and unfolding section is folded.

Moreover, the portable information apparatus may be so arranged that the transparent section of the portable information apparatus functions as a lens so as to magnify and display the display screen.

In order to realize such characteristics that the display section display only on the region that can be seen when the portable information apparatus is in the folded state, the portable information apparatus may be so arranged as the following examples: (1) the portable information apparatus may be composed of a driving section (for example, a driving circuit) for driving the display section, and a control section (for example, a CPU) for controlling the driving section so as to display the information only on a part of the display section. The control section, for example, scans only a scanning line of the region in which the information is intended to be displayed (a region in the display section, which can be seen when the portable information apparatus is in the folded state), while driving only part of the display section by applying a predetermined voltage only in a data signal line of the region that is intended to be displayed; (2) alternatively, all of the scanning lines are scanned, while the driving section is controlled so as to apply an arbitrary gradation voltage into the data signal line.

The above-mentioned driving section may be realized by using a driving circuit, for example, which is provided with (a) a scanning signal line driving section for outputting, in order (sequent output), respective scanning signals for display, which are based on the information to be displayed on the display section, to the respective scanning signal lines, (b) input means for receiving a switching instruction signal for switching the ways of the output to the respective scanning signal lines from a sequent output (outputting in order) to a batch output (outputting in batch), and (c) control means for controlling the scanning signal line driving section so as to output the scanning signals for display to the respective scanning signal lines in batch, in accordance with the switching instruction signal.

It is preferable for the driving circuit that the scanning signal line driving section is provided with a plurality of shift resistors, which are connected in series with each other, for outputting, in order, the scanning signals for display respectively to the respective scanning signal lines.

With the above arrangement, where the plural shift resistors are provided, it is possible to reduce the number of the shift resistors that are for the non-image region, but require the usual scanning, when the setting of the image display is changed, for example. In other words, with the above arrangement, in case all scanning signal line of one shift resistor correspond to the non-image region, it is possible to display the non-image region by scanning the shift resistor in batch. This reduces the number of the shift resistors that for the non-image region, but require the usual scanning, thereby reducing the electricity consumption of the portable information apparatus.

Furthermore, with the above arrangement, where the plural shift resistors are provided, it is possible to subject each shift resistor to the batch scanning, or to stop each shift resistor from operating. This ensures the reduction of the electricity consumption of the portable information apparatus.

It is preferable for the driving circuit that the control means is provided with stopping means for stopping the scanning signal line driving section from operating in accordance with a synchronizing signal and a switching signal which are for displaying an image on the display section according to the information. With the above arrangement, the stopping means further ensures the reduction of the electricity consumption of the portable information apparatus.

A driving method for driving the display section that is composed of a single-colored non-image region and an image display region in accordance with the information, having a partial display function, may be realized, for example, by employing a driving method that includes the steps of (a) respectively outputting, in order, the scanning signals for display to the respective scanning signal lines in accordance with the information so as to display an image on the display section in accordance with the information, (b) outputting signals, which are in accordance with the information, to the respective data signal lines, and (c) outputting in batch the scanning signals for display, which are for the non-image region, and signals that are in accordance with display information, to the respective scanning signal lines and the respective data signal lines, which correspond to the non-image region.

It is preferable that the portable information apparatus is provided with data signal line control means for so controlling the data signal line driving section as to output the data signals for display for the non-image region to the respective data signal lines when the scanning signals for display are outputted in batch. With the above arrangement, the data signal line control means can stabilize the display of the non-image region.

It is preferable that the portable information apparatus is further provided with first stopping means for stopping the data signal line driving section from operating for a period between a time when the batch output is carried out in accordance with the horizontal period based on the display data, and a time when a next sequent output is carried out. It is preferable that the portable information apparatus is further provided with second stopping means for stopping the scanning signal line driving section from operating for a period between a time when the batch output is carried out in accordance with the horizontal period based on the display data, and a time when a next sequent output is carried out. With the above arrangement, where the first stopping means and the second stopping means are provided, it is possible to further ensure the reduction of the electricity consumption of the portable information apparatus.

In the portable information apparatus, it is preferable that a first clock signal for the display of the image display region is different from a second clock signal for the display of the non-image region. With the above arrangement, it is possible to set the second clock signal for the display of the non-image region to have a frequency lower than that of the first clock signal. This further ensures the reduction of the electricity consumption of the portable information apparatus, while the low frequency of the second clock signal stabilizes the display operation.

[Second Embodiment]

Explained below is another embodiment of a portable information apparatus of the present invention, with reference to FIGS. 15 to 17. Noted that, in the present embodiment, explained is a case where the portable information apparatus of the present invention is adapted for a portable telephone of the folder type (hereinafter, just referred to as a portable telephone).

Figure 15:
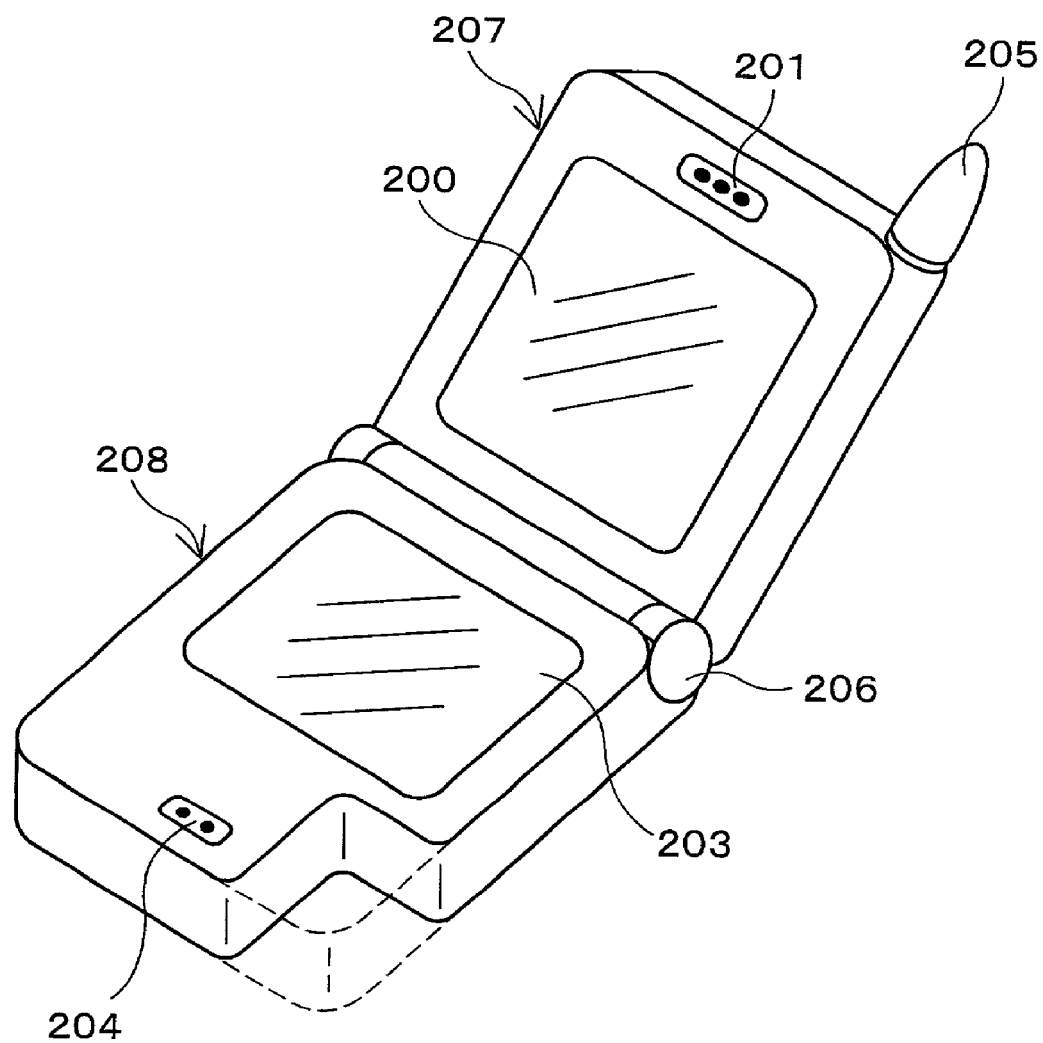
FIG. 15 is a perspective view illustrating a portable telephone of the folder type of a second embodiment of the present invention, which is unfolded.
Figure 16:
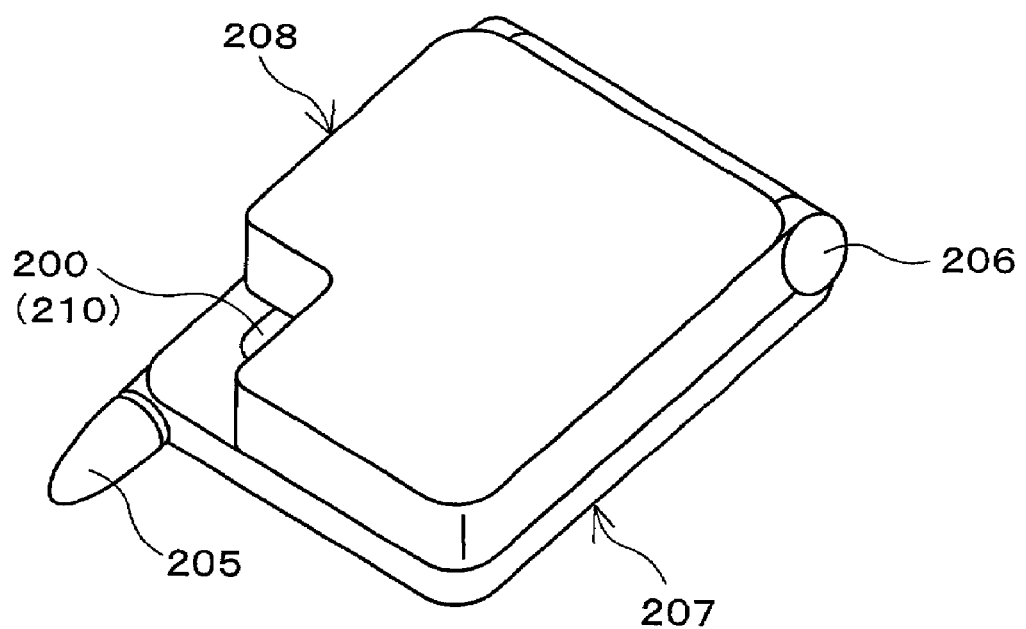
FIG. 16 is a perspective view showing the portable telephone of the folder type of the second embodiment of the present invention, which is folded.

FIGS. 15 and 16 are perspective views illustrating a portable telephone of the present embodiment. FIG. 15 shows the portable telephone in an unfolded state, that is, a state in which an upper main body 207 is unfolded with respect to a lower main body 208. Meanwhile, FIG. 16 illustrates the portable telephone in a folded state, that is, a state in which the upper main body 207 is unfolded with respect to the lower main body 208. In addition, in FIG. 16, shown is a state where the lower main body 208 overlaps the upper main body 207.

The upper main body 207 is provided with a display screen (display section) 200, a speaker 201, and an antenna 205, while the lower main body 208 is provided with an operation button 203 and a microphone 204. A hinge 206 connects the upper main body 207 and the lower main body 208 in such a manner that the upper main body 207 and the lower main body 208 can be folded and unfolded.

Figure 17:
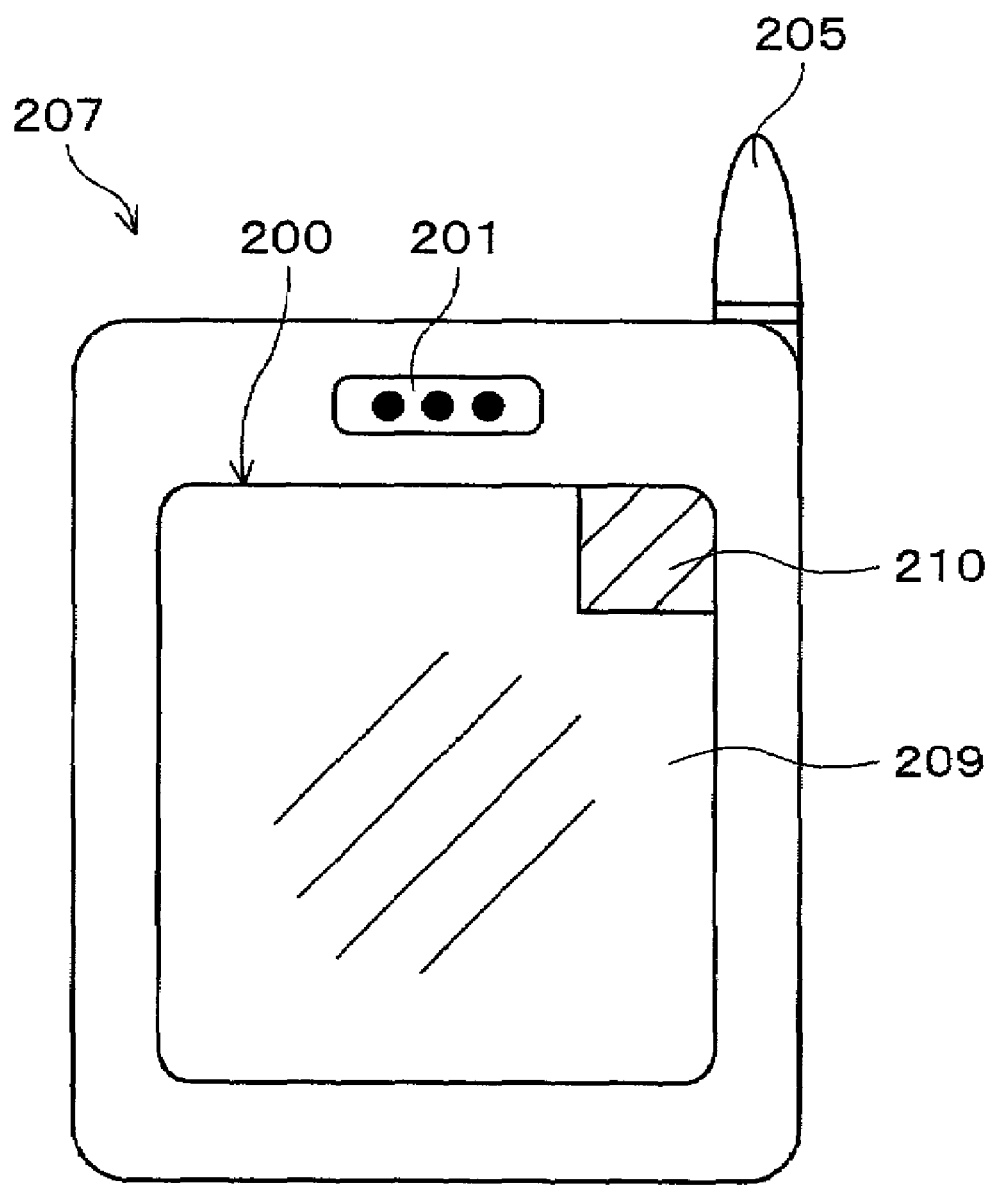
FIG. 17 is a plan view illustrating a display section of an upper main body of the portable telephone of the folder type of the second embodiment of the present invention.

FIG. 17 is a plan view illustrating the upper main body 207. The display screen 200 of the upper main body 207 is composed of a non-image region (display section) 209 and an image display region (display section) 210. The non-image region 209, which is shown in FIG. 17, is a region where no information is displayed when the portable telephone is in the folded state, in a similar manner as the non-image region 109 (see FIG. 3). When the portable telephone is in the folded state, a driving circuit for driving the display screen is stopped, or the display screen is displayed in a single color by scanning all scanning lines and applying a gradation voltage in signal lines, in order that no information is displayed in the non-image region 209. The image-display region 210, which is indicated by slant lines in FIG. 17, is a region where display of information is continued by partial driving even when the portable telephone is in the folded state.

When the portable telephone is in the unfolded state, information is displayed in both the non-image region 209 and the image display region 210, thereby performing a whole-screen display on the display screen 200. In addition, similarly to the case of the display screen 100, a liquid crystal display apparatus of the active matrix type, in which a TFT is formed, is used as the display screen 200. This makes it possible to perform a color display, a dynamic display and the like display in a high image quality.

The present embodiment, instead of including the transparent section 102 (see FIGS. 1 and 2), is so arranged that the lower main body 208, as shown in FIGS. 15 and 16, is smaller than the upper main body 207 (a part of the lower main body 208 is missing with respect to the shape and size of the upper main body 207), so as to show the image display region 210 of the display screen 200 when the portable telephone is in the folded state. With this arrangement, it is possible to attain a similar effect as the arrangement in which the lower main body 108 is provided with the transparent section 102 (see FIGS. 1 and 2).

The image display region 210 continues the display of the information by the partial driving when the portable telephone is in the folded state. Therefore, the image display region 210 need be in such a position which can be seen when the portable telephone is in the folded state. FIG. 17 is the plan view illustrating the upper main body 207 of the present embodiment. In the present embodiment, the image display region 210 is the region indicated by the slant lines, where included is an corner of the display screen 200, which is close to both the antenna 205 and the speaker 201. The rest of the display screen 200 is the non-image region 209. However, the image display region 210 may be arbitrarily set in terms of position and size in accordance with a design of an appearance, provided that the image display region 210 is in a position that can be seen when the portable telephone is in the folded state.

Because various information displayed on the image display region 210 of the display screen 200 can be checked when the portable telephone is in the folded state, as discussed above, it is possible to check the various information even during a call wait time. Furthermore, it is possible to achieve both a high image quality and a low electricity consumption in terms of a color display, a dynamic display and the like display.

[Third Embodiment]

Described below is still another embodiment of a portable information apparatus of the present invention, with reference to FIGS. 18 to 20. Note that, in the present embodiment, explained is a case where the portable information apparatus of the present invention is adapted for a portable telephone of the folder type (hereinafter, just referred to as a portable telephone).

Figure 18:
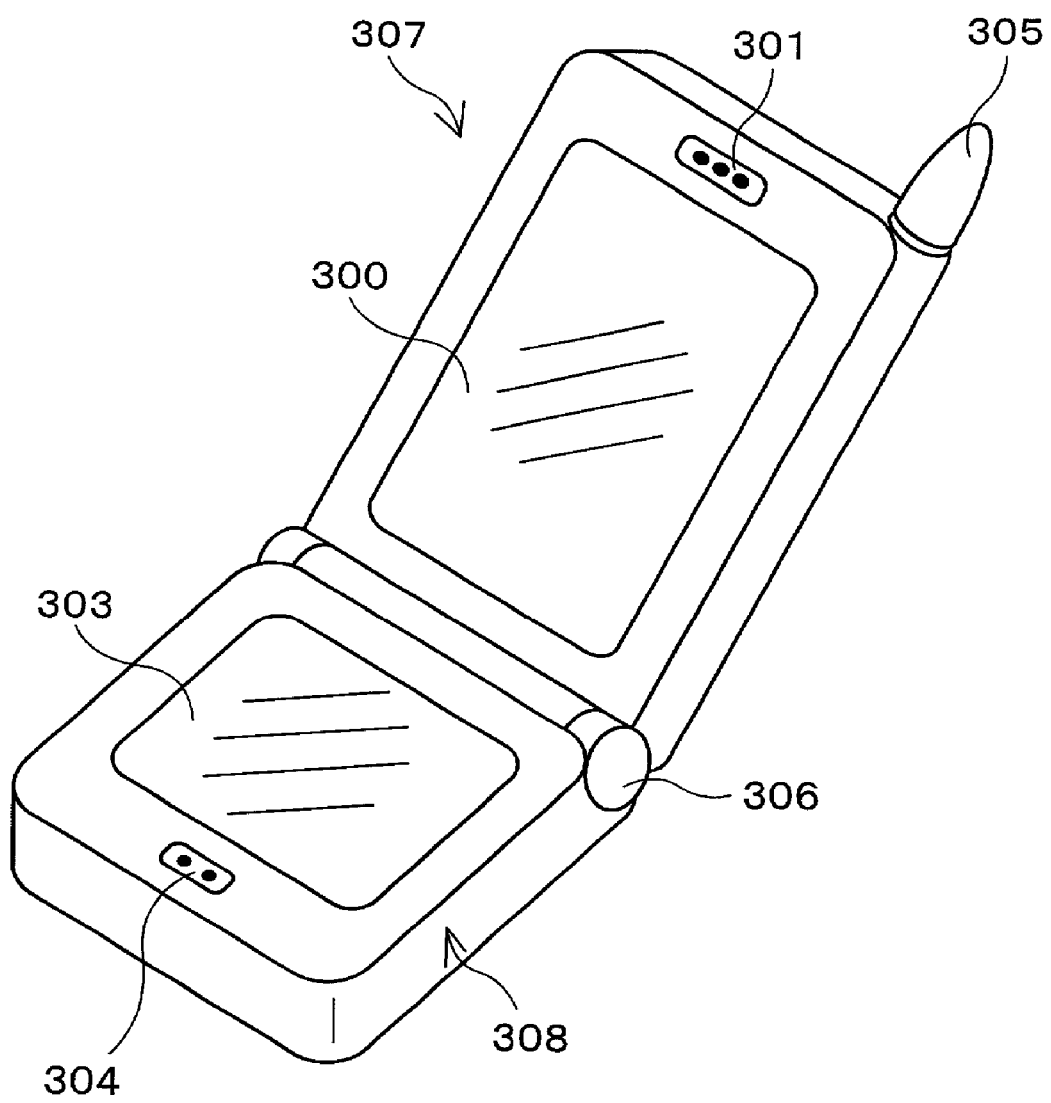
FIG. 18 is a perspective view illustrating a portable telephone of the folder type of a third embodiment of the present invention, which is unfolded.
Figure 19:
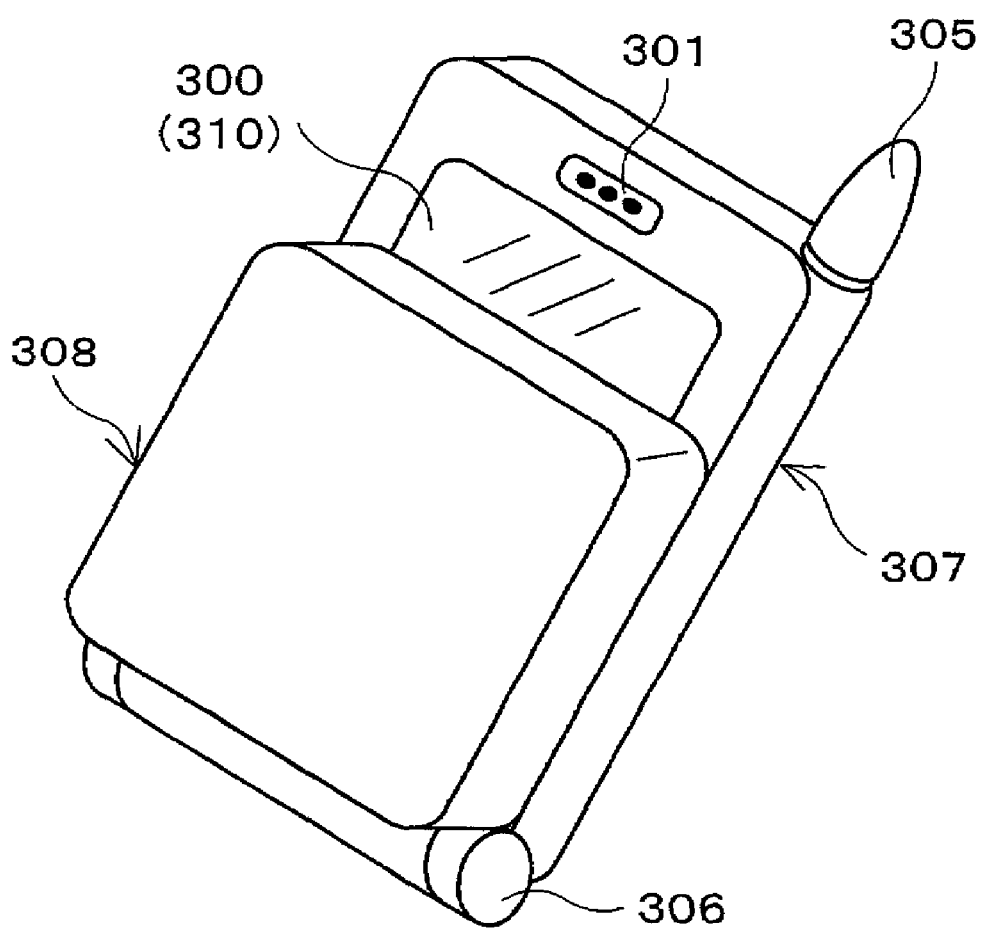
FIG. 19 is a perspective view showing the portable telephone of the folder type of the third embodiment of the present invention, which is folded.

FIGS. 18 and 19 are perspective views illustrating a portable telephone of the present embodiment, where FIG. 18 shows the portable telephone that is in an unfolded state, that is, a state in which an upper main body 307 is unfolded with respect to a lower main body 308, while FIG. 19 illustrates the portable telephone that is in a folded state, that is, a state in which the upper main body 307 is folded with respect to the lower main body 308. Note that, in FIG. 19, the lower main body 308 overlaps the upper main body 307.

Figure 20:
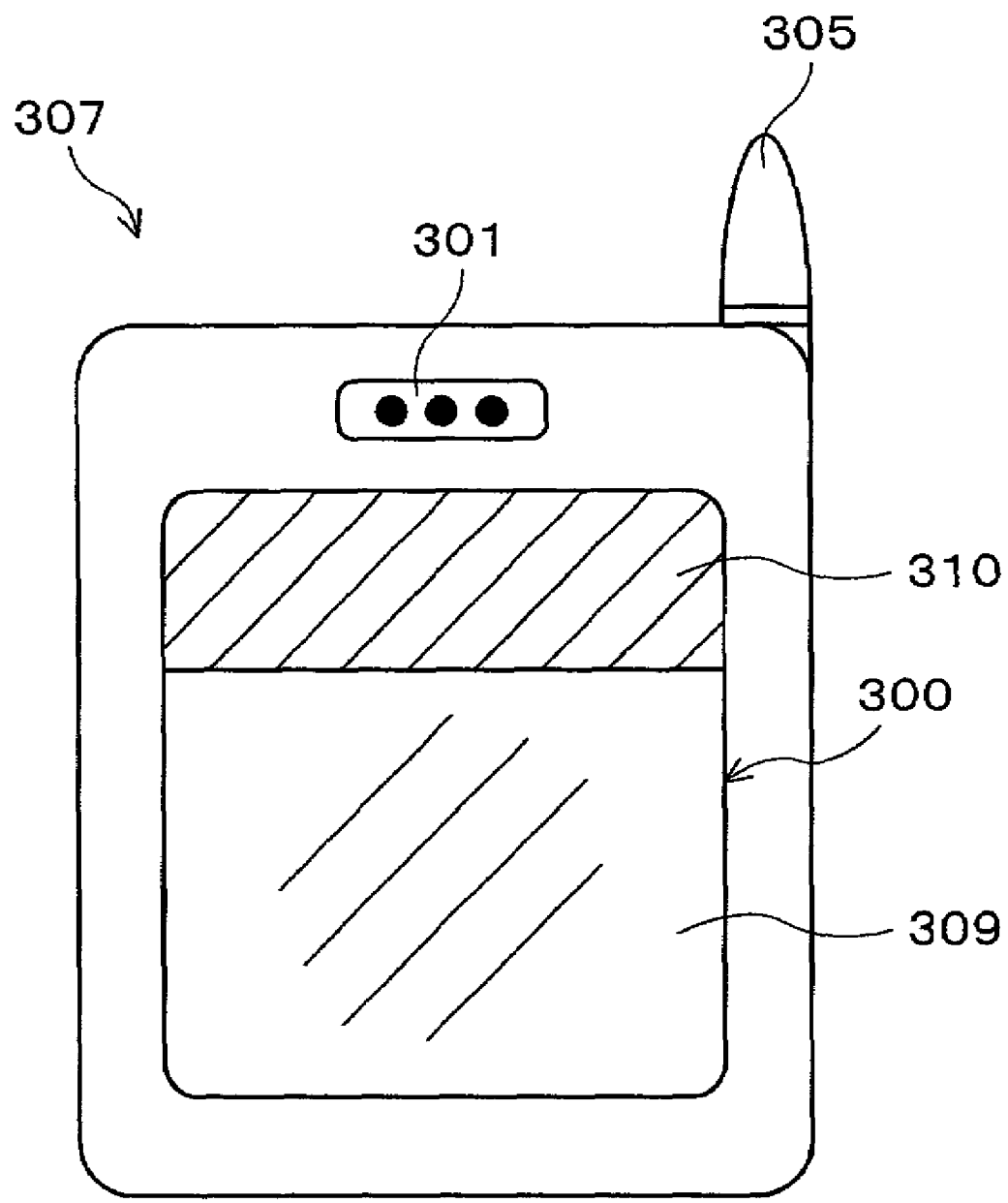
FIG. 20 is a plan view illustrating a display section of an upper main body of the portable telephone of the folder type of the third embodiment of the present invention.

In FIGS. 18 to 20, a reference numeral 300 indicates the display screen (display section), a reference numeral 301 indicates a speaker, a reference numeral 303 indicates an operation button, a reference numeral 304 indicates a microphone, and a reference numeral 305 indicates an antenna.

The upper main body 307 is provided with the display screen 300, the speaker 301, and the antenna 305, while the lower main body 308 is provided with the operation button 303 and the microphone 304. A hinge 306 connects the upper main body 307 and the lower main body 308 in such a manner that the upper main body 307 and the lower main body 308 can be folded and unfolded.

FIG. 20 is a plan view illustrating the upper main body 307 of the present embodiment. The display screen 300 is composed of a non-image region (display section) 309 and an image display region (display section) 310. Used as the display screen 300 is a liquid crystal display apparatus of the active matrix type which is provided with a TFT, which is a three-terminal element that is excellent in brightness, contrast and has a fast response speed. With the liquid crystal display apparatus, the display screen 300 can perform a color display and a dynamic display in a high image quality.

Similarly to the non-image region 109 (see FIG. 3), the non-image region 309 shown in FIG. 20 is a region where no information is displayed, when the portable telephone is in the folded state, (a) by stopping a driving circuit for driving the display screen, or (2) by performing a single-colored display which is carried out by scanning all scanning lines and by applying a gradation voltage into signal lines. Meanwhile, an image display region 310, which is indicated by slant lines, is a region where display of information is continued by partial driving even when the portable telephone is in the folded state.

In general, a liquid crystal display apparatus is driven to display by scanning all scanning lines in order in a display screen while a predetermined voltage is applied into data signal lines that cross with the scanning lines at a right angle, so as to apply a voltage in pixels provided on a line so as to display.

In case only a part of the display screen is displayed, only scanning lines in a region to be displayed are scanned, while scanning lines in a region not to be displayed, are not scanned, meanwhile, a predetermined voltage is applied into only data signal lines in the region to be displayed, but not into data signal lines in the region not to be displayed, where the data signal lines cross with the scanning lines at a right angle, instead of scanning all of the scanning lines. This makes it possible to drive only the part of the display screen (partial driving) with ease. Alternatively, a non-display state can be prepared easily by scanning all the scanning lines in the region not to be displayed of the display screen at the same time while an arbitrary gradation voltage is applied into the data signal lines.

As shown in FIGS. 18 and 19, the lower main body 308 is shorter than the upper main body 307. Because of this, the lower main body 308 does not cover the whole display screen 300 when the portable telephone is in the folded state, thereby showing a part of the display screen 300, that is, the image display region 310. This makes it possible to recognize various information displayed on the image display region 310, which is the part of the display screen 300, for example, during a call wait time, in which the portable telephone is in the folded state.

In the present embodiment, when the portable telephone is in the folded state, the image display region 310, which is subjected to the partial driving, is provided in a position close to the speaker 301, in the display screen 300, as shown in FIG. 20. The rest of the display screen 300 is the non-image region 309. However, the position of the image display region 310 is not limited to this. The image display region 310 may have any position, provided that the position is to expose the image display region 310 when the portable telephone is folded, in other words, the position that can be seen. Because a shape of the lower main body 308 can be changed so as to show an arbitrary region of the display screen 300, it is possible to set the position and a size of the image display region 310 in accordance with a design of the portable telephone.

Because the various information displayed on the image display region 310 of the display screen 300 can be checked when the portable telephone is in the folded state as discussed above, it is possible to check the various information even during the call wait time. Furthermore, this makes it possible to compatibly achieve a high image quality and a low electricity consumption for a color display and a dynamic display of the display screen.

The portable information apparatus of the present invention is characterized in that at least one of a position and a size of the image display region is changed in accordance with the information displayed on the display section.

With the above arrangement, it is possible to further reduce the electricity consumption of the portable information apparatus. In other words, in accordance with the contents of the information to be displayed, only a region necessary to display the information can be the image display region, thereby expanding a size of the non-image region.

Here, because the non-image region consumes less electricity than the image display region, the electricity consumption of the display section can be further reduced by expanding the size of the non-image region in the display section. This further reduces the electricity consumption of the portable information apparatus.

The portable information apparatus of the present invention is provided with (1) a driving section for driving the display section, and (2) a control section for controlling the driving section so as to display the information, when the portable information apparatus is folded, on a region of the display section, which can be seen when the portable information apparatus is in a folded state, the driving section including (a) a scanning signal line driving section for outputting to each scanning signal line a scanning signal for display, which is based on information to be displayed on the display section, (b) a data signal line driving section for outputting to each data signal line a data signal for display, which is based on information to be displayed on the display section, and (c) a setting section for setting in the display section the image display region, in which the information is displayed, and the non-image region, which is in a single color, wherein the control section controls the scanning signal line driving section so as to scan the scanning signals for display at a same time with respect to a plurality of scanning signal lines that correspond to non-image region set by the setting section.

With the above arrangement, where the scanning signal for display is outputted in such a manner that a plurality of the respective scanning signal lines are scanned at the same time in accordance with the switching instruction signal, it is possible to display the non-display region in the single color, for example, in a white color.

Here, because the non-image region is displayed by scanning the plural scanning signal lines at the same time, it is possible to have a period during which the scanning signal line driving section is stopped, after the non-image region is displayed. This makes it possible to reduce electricity consumption of the scanning signal line driving section, thereby reducing the electricity consumption of the portable information apparatus.

The portable information apparatus of the present invention is provided with a transparent section in a part of the portable information apparatus, which faces the display section when the portable information apparatus is folded, the transparent section including a lens for magnifying and displaying information displayed on the display section.

With the above arrangement, where the displayed information is magnified by the lens when the information on the display section is seen, it is possible to check the information displayed on the display section surely and easily.

The portable information apparatus of the present invention may be so arranged that radio wave receiving condition and/or battery lasting information is displayed on the region of the image display region, which can be seen when the portable information apparatus is folded. with the above arrangement, the radio wave receiving condition and/or the battery lasting information, which are checked so often, can be seen without unfolding the portable information apparatus, that is, when the portable information apparatus remains being folded, in case the portable information apparatus is a type that receives a radio wave, such as the portable telephone.

The portable information apparatus of the present invention is provided with a transparent section in a part of the portable information apparatus, which faces to the display section when the portable information apparatus is folded, the transparent section including a transparent touch panel so as to operate the portable information apparatus by pushing a predetermined region of the touch panel.

With the above arrangement, it is possible to operate the portable information apparatus by pushing the predetermined region of the touch panel in accordance with the information displayed on the display section. This makes it possible to operate the portable information apparatus in accordance with the information displayed on the display section while the portable information apparatus remains being folded.

A portable information apparatus of the present invention is further provided with a detector for detecting whether or not the portable information apparatus in a folded state, wherein the setting section sets the image display region for displaying the information, and the non-image region in the single color, in accordance with a detection result given by the detector.

With the above arrangement, it is possible to set the image display region and the non-image display region in accordance with the detection result given by the detector. This makes it possible to set the display section in accordance with states (the folded or unfolded states) of the portable information apparatus. In short, it is possible to set a region which cannot be seen, as the non-image region, in accordance with a detection result given by the detector, indicating the portable information apparatus is folded. This surely prevents the information from being displayed in vain in the region which cannot be seen, thereby reducing the electricity consumption of the portable information apparatus.

The portable information apparatus of the present invention may be so arranged that the display section is composed of a plurality of divisional regions, and the setting section decides which of the divisional regions is to be the image display region and which of the divisional regions is to be the non-image region, in accordance with contents of the information to be displayed on the display section.

With the above arrangement, where the image display region and the non-image region are varied in accordance with the information displayed on the display section, it is possible that the image display region is composed of only the divisional region necessary for displaying the information, among the plural divisional regions. In this way, it is possible to surely prevent the electricity from being consumed unnecessarily. Note that, the respective divisional regions can display plural kinds of the information. Moreover, in case more than one divisional region is necessary to display the information, the image display region may be composed of plural divisional regions so as to display one piece of the information. Note that, in the present invention, the divisional region is a region which is divided into a region which has a sufficient size for displaying information. For example, if the display section is divided into two parts, there are two divisional regions in the display section.

The portable information apparatus of the present invention may be so arranged that the scanning signal line driving section includes a plurality of shift resistors for respectively outputting, in order, scanning signals for display to the respective scanning signal lines.

With the above arrangement, where the plural shift resistors are provided, it is possible to reduce the number of the shift resistors that need be subjected to the usual scanning, even if the shift resistors are for the non-image region, for example, even in case the setting of the image display region is changed. In short, one of the plural shift resistors can display the non-image region by being scanned in batch, where all the scanning signal lines of the shift resistor correspond to the non-image region.

Because this reduces the number of the shift resistors that need be subjected to the usual scanning, even if the shift resistors are for the non-image region, it is possible to reduce the electricity consumption of the portable information apparatus. Moreover, with the above arrangement, where the plural shift resistors are provided, it is possible to scan in batch the respective shift resistors individually, or to stop the shift resistors from operating, thereby surely reducing the electricity consumption of the portable information apparatus.

The portable information apparatus of the present invention may be so arranged that the scanning signal line driving section includes a plurality of shift resistors for respectively outputting, in order, scanning signals for display to the respective scanning signal lines.

With the above arrangement, where the first stopping means stops the data signal line driving section from operating, it is possible to further ensure that the portable information apparatus has the low electricity consumption.

The portable information apparatus of the present invention may be so arranged that the scanning signal line driving section further includes second stopping means for stopping the scanning signal line driving section from operating for a period between (a) a time when the setting section scans at the same time a plurality of the scanning signals for display with respect to each scanning signal line that corresponds to the non-image region and (b) a time for carrying out a next sequential output.

With the above arrangement, where the second stopping means stops the scanning signal line driving means from operating, it is possible to further ensure that the portable information apparatus has the low electricity consumption.

The portable information apparatus of the present invention may be so arranged that a first clock signal for a display on the image display region has a frequency different from that of a second clock signal for a display on the non-image display region.

With the above arrangement, where the second clock signal for displaying the non-image region has a frequency lower than that of the first clock signal, it is possible to further ensure that the portable information apparatus has the low electricity consumption, while stabilizing the display operation by the low frequency.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A portable information apparatus, which is of a folder type, comprising:

a display section for displaying information on one of surfaces that face each other when the portable information apparatus is folded, wherein said display section is composed of an image display region and a non-image region, where at least a part of said image display region can be seen when the portable information apparatus is folded,
the portable information apparatus further comprising:
a driving section for driving said display section; and
a control section for controlling said driving section so as to display the information, when the portable information apparatus is folded, on a region of said display section, which can be seen when the portable information apparatus is in a folded state,
said driving section, including:
a scanning signal line driving section for outputting to each scanning signal line a scanning signal for display, which is based on information to be displayed on said display section;
a data signal line driving section for outputting to each data signal line a data signal for display, which is based on information to be displayed on said display section; and
a setting section for setting in said display section said image display region, in which the information is displayed, and said non-image region, which is in a single color,
wherein said control section controls said scanning signal line driving section so as to scan the scanning signals for display at a same time with respect to a plurality of scanning signal lines that correspond to non-image region set by said setting section.

2. A portable information apparatus as set forth in claim 1, further comprising:
a detector for detecting whether or not the portable information apparatus in a folded state,
wherein said setting section sets said image display region for displaying the information, and said non-image region in said single color, in accordance with a detection result given by said detector.

3. The portable information apparatus as set forth in claim 1, wherein said display section is composed of a plurality of divisional regions, and said setting section decides which of said divisional regions is to be said image display region and which of said divisional regions is to be said non-image region, in accordance with contents of the information to be displayed on said display section.

4. The portable information apparatus as set forth in claim 1, wherein said scanning signal line driving section includes a plurality of shift resistors for respectively outputting, in order, scanning signals for display to said respective scanning signal lines.

5. The portable information apparatus as set forth in claim 1, wherein said data signal line driving section further includes first stopping means for stopping said data signal line driving section from operating for a period between (a) a time when said setting section scans at the same time a plurality of the scanning signals for display with respect to each scanning signal line that corresponds to said non-image region and (b) a time for carrying out a next sequential output.

6. The portable information apparatus as set forth in claim 1, wherein said scanning signal line driving section further includes second stopping means for stopping said scanning signal line driving section from operating for a period between (a) a time when said setting section scans at the same time a plurality of the scanning signals for display with respect to each scanning signal line that corresponds to said non-image region and (b) a time for carrying out a next sequential output.

7. The portable information apparatus as set forth in claim 1, wherein a first clock signal for a display on said image display region has a frequency different from that of a second clock signal for a display on said non-image display region.

8. The portable information apparatus as set forth in claim 1, comprising:
a transparent section in a part of the portable information apparatus, which faces said display section when the portable information apparatus is folded, said transparent section including a lens for magnifying and displaying information displayed on said display section.

9. The portable information apparatus as set forth in claim 1, wherein radio wave receiving condition and/or battery lasting information is displayed on the region of said image display region, which can be seen when the portable information apparatus is folded.

10. The portable information apparatus as set forth in claim 1, comprising:
a transparent section in a part of the portable information apparatus, which faces to said display section when the portable information apparatus is folded, said transparent section including a transparent touch panel so as to operate the portable information apparatus by pushing a predetermined region of said touch panel.

* * * * *